(12) United States Patent
Lisewski et al.

(10) Patent No.: US 11,733,710 B2
(45) Date of Patent: *Aug. 22, 2023

(54) REMOTE TOKEN-BASED CONTROL OF AUTONOMOUS VEHICLES

(71) Applicant: Verizon Patent and Licensing Inc., Basking Ridge, NJ (US)

(72) Inventors: Kevin Lisewski, Ramsey, NJ (US); Arvind Basra, Glen Ridge, NJ (US); Glenna Colaprete Hudson, Henrietta, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 332 days.

This patent is subject to a terminal disclaimer.

(21) Appl. No.: 17/014,416

(22) Filed: Sep. 8, 2020

(65) Prior Publication Data
US 2020/0401162 A1 Dec. 24, 2020

Related U.S. Application Data

(63) Continuation of application No. 15/621,466, filed on Jun. 13, 2017, now Pat. No. 10,795,378.

(51) Int. Cl.
*H04L 9/32* (2006.01)
*B60R 25/24* (2013.01)
(Continued)

(52) U.S. Cl.
CPC ......... *G05D 1/0297* (2013.01); *H04L 9/3213* (2013.01); *H04L 9/3234* (2013.01); *B60R 25/241* (2013.01); *G01S 19/40* (2013.01); *G01S 19/42* (2013.01); *G01S 19/52* (2013.01); *G05D 2201/0213* (2013.01); *G08G 1/202* (2013.01);
(Continued)

(58) Field of Classification Search
CPC .......... G05D 1/0297; G05D 2201/0213; H04L 9/3213; H04L 9/3234; H04L 2209/80; H04L 2209/84; B60R 25/241; G01S 19/40; G01S 19/42; G01S 19/52; G01S 5/0027; G01S 19/14; G08G 1/202
See application file for complete search history.

(56) References Cited

U.S. PATENT DOCUMENTS

| 5,414,841 A | 5/1995 | Bingham et al. |
| 2011/0010022 A1 | 1/2011 | Beavin |

(Continued)

OTHER PUBLICATIONS

Bi, Yuanguo, et al. "A multi-channel token ring protocol for QoS provisioning in inter-vehicle communications." IEEE Transactions on Wireless Communications 8.11 (2009): 5621-5631. (Year: 2009).*

*Primary Examiner* — Russell Frejd
*Assistant Examiner* — Ana D Thomas

(57) ABSTRACT

A method, network device, and non-transitory storage medium are described, in which a device receives input from an entity that is authorized to select parameters associated with issuing remote control commands to multiple autonomous vehicles operated in a geographic service area; generates an autonomous vehicle control token based on selected parameters; and transmits the autonomous vehicle control token via a plurality of multicast bearers associated with multiple base stations of the geographic service area in a wireless network, to the multiple autonomous vehicles over a same multicast channel.

20 Claims, 23 Drawing Sheets

(51) Int. Cl.
  *G01S 19/40* (2010.01)
  *G01S 19/42* (2010.01)
  *G01S 19/52* (2010.01)
  *G05D 1/02* (2020.01)
  *G08G 1/00* (2006.01)

(52) U.S. Cl.
  CPC ...... *H04L 2209/80* (2013.01); *H04L 2209/84* (2013.01)

(56) References Cited

U.S. PATENT DOCUMENTS

2015/0009821 A1* 1/2015 Sridhar ................ H04W 72/30
            370/235
2018/0017970 A1* 1/2018 Kim .................... G05D 1/0066

* cited by examiner

REMOTE TOKEN-BASED CONTROL OF AUTONOMOUS VEHICLES

CROSS REFERENCE TO RELATED APPLICATION

This patent application is a continuation of U.S. patent application Ser. No. 15/621,466, "REMOTE TOKEN-BASED CONTROL OF AUTONOMOUS VEHICLES," filed on Jun. 13, 2017, the contents of which are hereby incorporated by reference in their entirety.

BACKGROUND

Autonomous vehicles are vehicles that employ various sensors for sensing the driving environment and use an advanced control system for navigating, without human operator input, based on the sensed driving environment. The various sensors employed by autonomous vehicles may include, for example, radar, lasers, Global Positioning Systems (GPS), image/video processing systems, and odometers. The advanced control systems interpret the sensor information provided by the various sensors to detect aspects of the driving environment and to identify a navigation route for the vehicles. The sensors, in conjunction with the control systems, are used to understand the world around each vehicle, including the position of surrounding vehicles, the status of any nearby infrastructure, any traffic concerns, and any potential safety hazards. Autonomous vehicles are predicted to reduce traffic accidents and to improve the speed and flow of traffic on vehicle roadways.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Exemplary embodiments described herein enable token-based remote control of autonomous vehicles. Operators associated with, for example, a government entity, may use a management portal to select a type of autonomous vehicle control to be implemented by a respective control token. The operators may select the type of remote vehicle control, and provide corresponding parameters associated with that type of vehicle control, and the management portal causes a control token to be generated, based on the parameters, and transmitted to one or more autonomous vehicles. Upon receipt of the control token, each autonomous vehicle may execute the remote control command(s), from the token, to alter the operation of the autonomous vehicle. The remote control command(s) may, for example, set a speed limit for the autonomous driving of the vehicle, increase or decrease the speed of the vehicle by a specified incremental value, enable or disable autonomous vehicle operation to take control away from the driver or to cause autonomous operation of the vehicle to be suspended and control returned to the driver, or specify a navigational re-route of the vehicle to cause the vehicle to drive on a different route to its destination. The management portal provides a user interface to the operator such that the operator can select a particular one of multiple different control token types, and can enter the appropriate parameters associated with the selected control token type.

Upon receipt of autonomous vehicle control tokens, a network entity, such as the management portal itself or another network device, may schedule the transmission of the tokens via a wireless network to the autonomous vehicles. Transmission of the control tokens may include multicasting the control tokens to multiple different autonomous vehicles within a certain area, such as a wireless network service area. In one implementation, the service area may be defined by an evolved Multimedia Broadcast Multicast Services (eMBMS) synchronization area. In other implementations, the service area may be defined geographically, geo-politically, or using any type of system for dividing the wireless network into defined service areas or regions.

Figure 1:
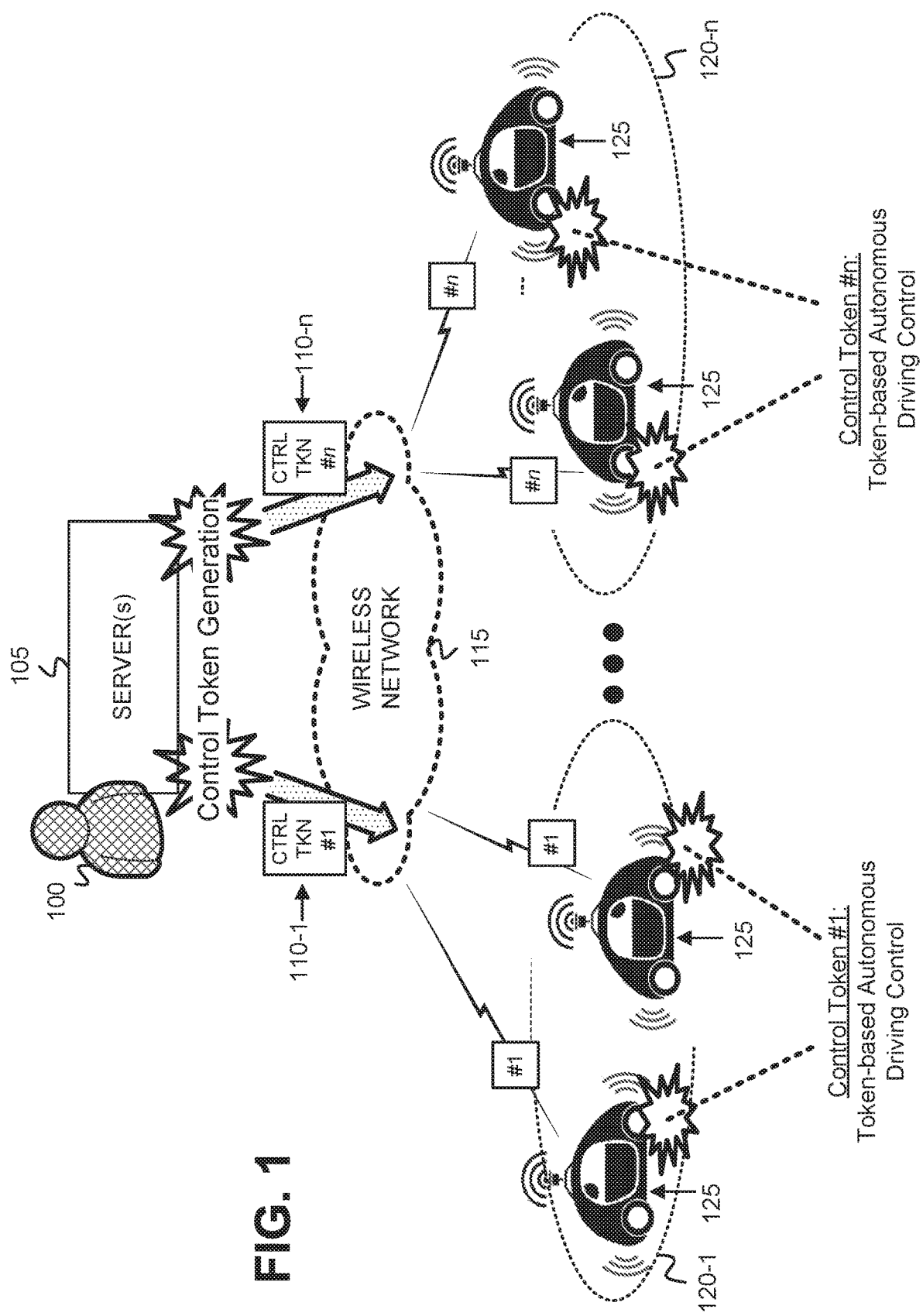
FIG. 1 depicts an exemplary overview of remote token-based control of autonomous vehicles.

FIG. 1 depicts an exemplary overview of remote token-based control of autonomous vehicles as described herein. As shown, a server(s) 105 may receive input from an operator 100, related to vehicle control parameters, that server(s) 105 may use to generate a control token 110-1 ("CTRL TKN #1" or "#1") that includes data, including at least one control command, for controlling the autonomous operation of autonomous vehicles 125. Operator 100 may include, for example, a person authorized by a government entity (e.g., city, county, state, federal), a person authorized by a business entity (e.g., owner of a fleet of shipping trucks), or a person authorized by an automotive Original Equipment Manufacturer (OEM). An exemplary implementation of control token 110-1 is described in further detail with respect to FIG. 7 below. Server(s) 105 sends the control token 110-1 to a wireless network 115 for wireless transmission to a service area 120-1 that includes one or more autonomous vehicles 125. Operator 100 may initiate the generation of control token 110-1, via server(s) 105, based on current traffic conditions (e.g., an accident, congestion) or weather conditions existing in the service area 120-1, or based on other factors. Upon receipt of control token 110-1 at the one or more autonomous vehicles 125 in service area 120-1, each autonomous vehicle 125 extracts the data, including the at least one control command, from the received control token 110-1 and a relevant component(s) at vehicle 125 executes the at least one control command to control the operation of vehicle 125. The control of the operation of the vehicle 125 may include a one-time application of a control command (e.g., turn on headlights), a control command that applies to a certain geographic region (e.g., reduce speed 10 mph between exits 10 and 20 on interstate 90), or a control command(s) that applies to a certain period of time (e.g., turn on hazard lights for a ten minute interval).

As further shown in FIG. 1, server(s) 105 may receive further input, related to additional vehicle control parameters, from operator 100 (or a second, different operator not shown) that server(s) 105 may use to generate a control token 110-n ("CTRL TKN #n" or "#n") that includes data, including at least one control command, for controlling the autonomous operation of autonomous vehicles in a different service area 120-n. Server(s) 105 sends the control token 110-n to wireless network 115 for wireless transmission to service area 120-n that includes one or more autonomous vehicles 125. Operator 100 may initiate the generation of control token 110-n, via server(s) 105, based on current traffic conditions (e.g., an accident, congestion) or weather conditions existing in the service area 120-n, or based on other factors. Upon receipt of control token 110-n at the one or more autonomous vehicles 125 in service area 120-n, each autonomous vehicle 125 extracts the data, including the at least one control command, from the received control token 110-n and a relevant component(s) at vehicle 125 executes the at least one control command to control the operation of vehicle 125. Similar to the control token described with respect to service area 120-1, the control of the operation of the vehicle 125 may include a one-time application of a control command (e.g., turn on headlights), a control command that applies to a certain geographic region (e.g., reduce speed 5 mph between exits 15 and 30 on interstate 10), or a control command(s) that applies to a certain period of time (e.g., turn on high beam lights for a 20 minute interval).

Figure 2A:
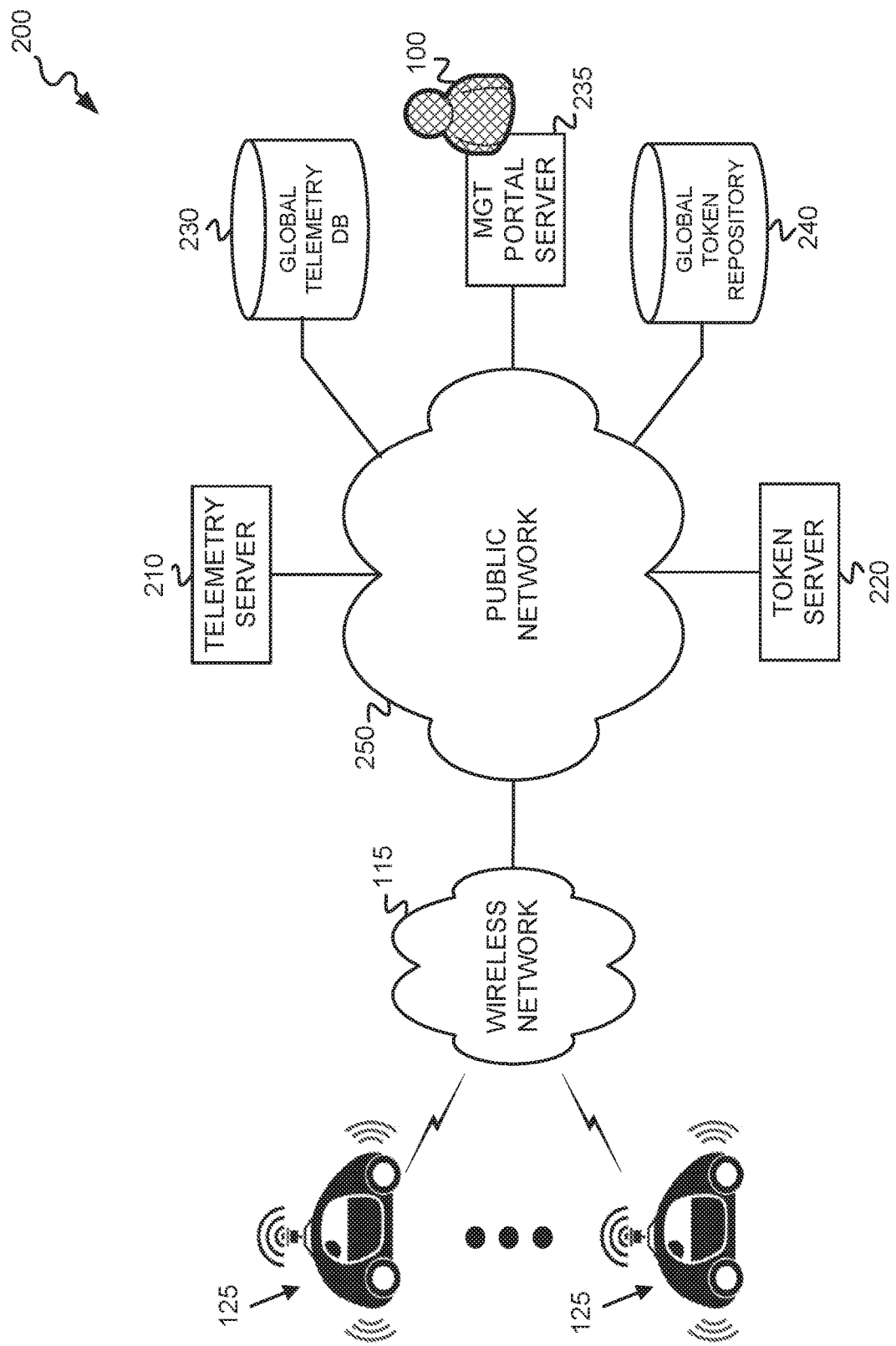
FIG. 2A illustrates an exemplary network environment in which remote token-based control of autonomous vehicles may be implemented.

FIG. 2A illustrates an exemplary network environment 200 in which remote token-based control of autonomous vehicles is implemented. Network environment 200 includes autonomous vehicles 125, wireless network 115, telemetry server 210, token server 220, global telemetry database (DB) 230, management portal server 235, global token repository 240, and public network 250. Token server 220 and/or management portal server 235 may correspond to server(s) 105 depicted in FIG. 1.

Autonomous vehicles 125 each include a vehicle that further includes vehicle sensors and an autonomous driving control unit that enable the vehicle 125 to drive autonomously without requiring driving vigilance on the part of the vehicle driver. Each autonomous vehicle 125 includes at least one wireless communication interface for communicating via wireless network 115. Each vehicle 125 may include multiple different types of wireless communication interfaces, including, for example, a personal area network (PAN) (e.g., BLUETOOTH), a wireless local area network (LAN) (e.g., Wi-Fi), and/or a cellular network communication interface. The wireless communication interface may, for example, receive multicast control tokens from token server 220 via wireless network 115.

Wireless network 115 may include one or more wireless networks including, for example, one or more public land mobile networks (PLMNs), and/or one or more satellite mobile networks. The PLMN(s) may include, for example, a Code Division Multiple Access (CDMA) 2000 PLMN, a Global System for Mobile Communications (GSM) PLMN, a Long Term Evolution (LTE) PLMN and/or other types of PLMNs (e.g., such as a fifth-generation or 5G network).

Telemetry server 210 includes one or more network devices that receive telemetry data, and possibly other data, from autonomous vehicles 125, and stores the data in global telemetry DB 230. Telemetry server 210 additionally analyzes the stored telemetry data, and/or the other data, to identify the occurrence of particular anomalies and/or pre-defined conditions, and notifies operator 100 of the occurrence of the particular anomalies and/or pre-defined conditions.

Token server 220 includes one or more network devices that generate autonomous vehicle control tokens based on input provided by operator 100 via management portal server 235, and store the control tokens in global token repository 240. Token server 220 additionally retrieves the control tokens and multicasts the control tokens to autonomous vehicles 125 in particular service areas based on priority information and a multicast schedule determined by management portal server 235.

Global telemetry DB 230 includes a data structure that stores telemetry data, and other data, received from telemetry server 210. Details of an exemplary implementation of the data structure of DB 230 is illustrated and described below with respect to FIG. 5.

Management portal server 235 includes one or more network devices that generate a user interface that operator 100 may interact with to receive notifications from telemetry server 210 and/or to initiate the creation of autonomous vehicle control tokens. The control tokens each include at least one control command, for remote control of autonomous vehicles 125 as specified by each control token. Management portal server 235 may be implemented by any type of network device(s) that can generate a user interface that is capable of presenting information to operator 100, and receiving operator input, such as parameters related to control of an autonomous vehicle 125. Management portal server 235 may be implemented by, for example, a server tower, a computer (e.g., desktop, laptop, palmtop, or tablet), a cellular telephone (e.g., a smart phone), a person digital assistant (PDA), or a wearable computer. Management portal server 235 receives operator input from operator 100, related to the vehicle control parameters, and provides the operator input to token server 220 for creation of an autonomous vehicle control token.

Global token repository 240 includes a data structure that stores autonomous vehicle control tokens, and other data, received from token server 220. Details of an exemplary implementation of the data structure of repository 240 is illustrated and described below with respect to FIG. 6.

Public network 250 may include one or more networks of various types including, for example, a telecommunications network (e.g., Public Switched Telephone Networks (PSTNs)), the Internet, a wired and/or wireless local area network (LAN), a wired and/or wireless wide area network (WAN), a metropolitan area network (MAN), an intranet, or a cable network (e.g., an optical cable network).

The configuration of the components of network environment 200 depicted in FIG. 2A is for illustrative purposes only, and other configurations may be implemented. Therefore, network environment 200 may include additional, fewer and/or different components, that may be configured differently, than depicted in FIG. 2A. For example, though a single operator 100 is depicted as using management portal server 235, network environment 200 may include multiple, different operators 100 using multiple, different management portal servers 235, or multiple, different operators 100 using a same management portal server 235.

Figure 2B:
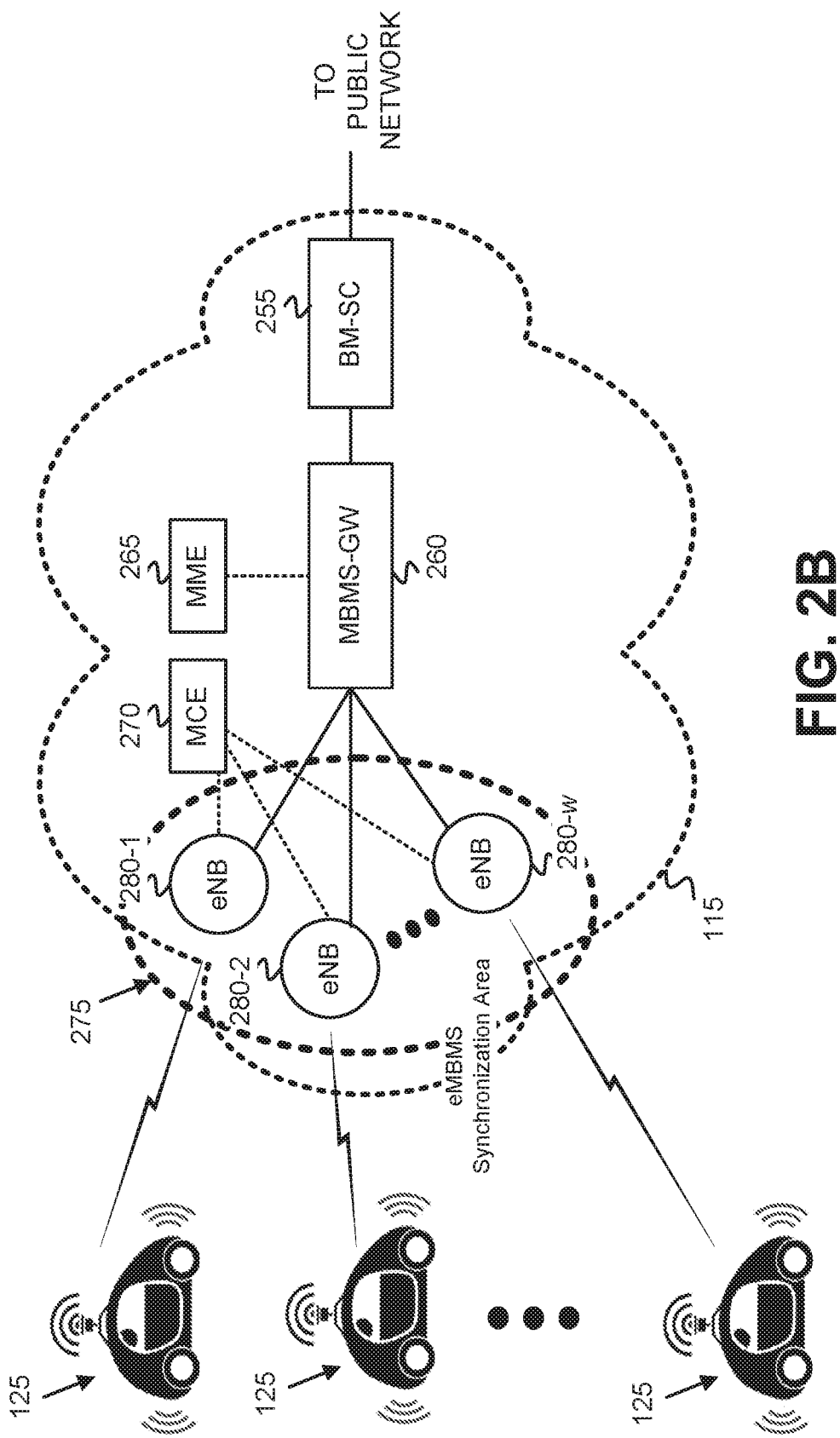
FIG. 2B depicts exemplary details of the wireless network of FIG. 2A.

FIG. 2B depicts an exemplary implementation of wireless network 115 in which wireless network 115 includes an MBMS network. MBMS consists of a specification directed towards providing the delivery of broadcast and multicast services within wireless networks, such as, for example, Third Generation Partnership Project (3GPP), Long Term Evolution (LTE), or Fifth Generation (5G) wireless networks. The multicast services of MBMS may transmit mobile television (TV) and radio broadcasts, live streaming video services, and data/file deliveries. When transmissions are delivered through an LTE network, the specification is referred to as eMBMS or LTE broadcast.

As shown in FIG. 2B, wireless network 115 may include a broadcast multicast service center (BM-SC) 255, a MBMS gateway (MBMS-GW) 260, a mobility management entity (MME) 265, a MBMS coordination entity (MCE) 270, and an eMBMS synchronization area(s) 275 that includes multiple eNodeBs (eNBs) 280-1 through 280-w (generically referred to as "eNB 280" or "eNBs 280"). As further shown in FIG. 2B, autonomous vehicles 125 may connect to various different eNBs 280 of eMBMS synchronization area(s) 275 via one or more wireless channels. eMBMS synchronization area 275 includes a group of eNBs 280 that are synchronized to transmit multicast data in a same multicast channel (MCH). The eNBs 280 in the synchronization area 275 transmit the same broadcast signals in a synchronized manner for better signal reception at an autonomous vehicle 125. eNodeBs 280 each include hardware that communicates directly with wireless devices (e.g., autonomous vehicles 125) to enable network service with wireless network 115 (e.g., a PLMN). Each of eNBs 280 includes a wireless transceiver for communicating with the wireless devices (e.g. vehicles 125), and a wired or wireless connection to other nodes of wireless network 115, such as a wired or wireless connection to MBMS-GW 260 and/or MCE 270.

BM-SC 255 includes one or more network devices that engage in authentication, content authorization, and billing; act as a proxy content server; and configure data flow through wireless network 115. MBMS-GW 260 includes one or more network devices that deliver MBMS packets to each eNB 280 transmitting the MBMS service. MBMS-GW 260 uses Internet Protocol (IP) multicast to deliver the downlink packets to eNBs 280.

MME 265 includes one or more network devices that perform, within wireless network 115, mobility management functions, call control management functions, session management functions, and/or identity management functions associated with providing network service to autonomous vehicles 125.

MCE 270 includes one or more network devices that are responsible for allocating time and frequency resources within wireless network 115. MCE 270 acts as an MBMS scheduler that allocates radio resources, performs session admission control, and manages MBMS services.

Though a single eMBMS synchronization area 275, a single MBMS-GW 260, and a single BM-SC 255 are depicted in FIG. 2B, wireless network 115 may include multiple different eMBMS synchronization areas 275, multiple MBMS-GWs 260 and multiple BM-SCs 255. For example, during a large scale broadcast of control tokens 110, the control tokens may be sent to multiple different BM-SCs 255 for multicast broadcasting to the multiple different eMBMS synchronization areas 275. The configuration of the components of wireless network 115 depicted in FIG. 2B is for illustrative purposes, and other configurations may be implemented. Therefore, wireless network 115 may include additional, fewer and/or different components, that may be configured differently, than depicted in FIG. 2B.

Multicasting of autonomous vehicle control tokens, using MBMS, may include token server 220 (not shown in FIG. 2B) pulling a control token from global token repository 240, and pushing the control token to BM-SC 255 in wireless network 115. BM-SC 255 then sends the control token to MBMS-GW 260. Upon receipt, MBMS-GW 260 broadcasts the control token, over a multicast bearer, to each eNB 280 in eMBMS synchronization area(s) 275. Each eNB 280, in turn, broadcasts the control token to autonomous vehicles 125 served by each eNB 280 via, for example, a particular channel within eMBMS synchronization area 275.

Figure 3:
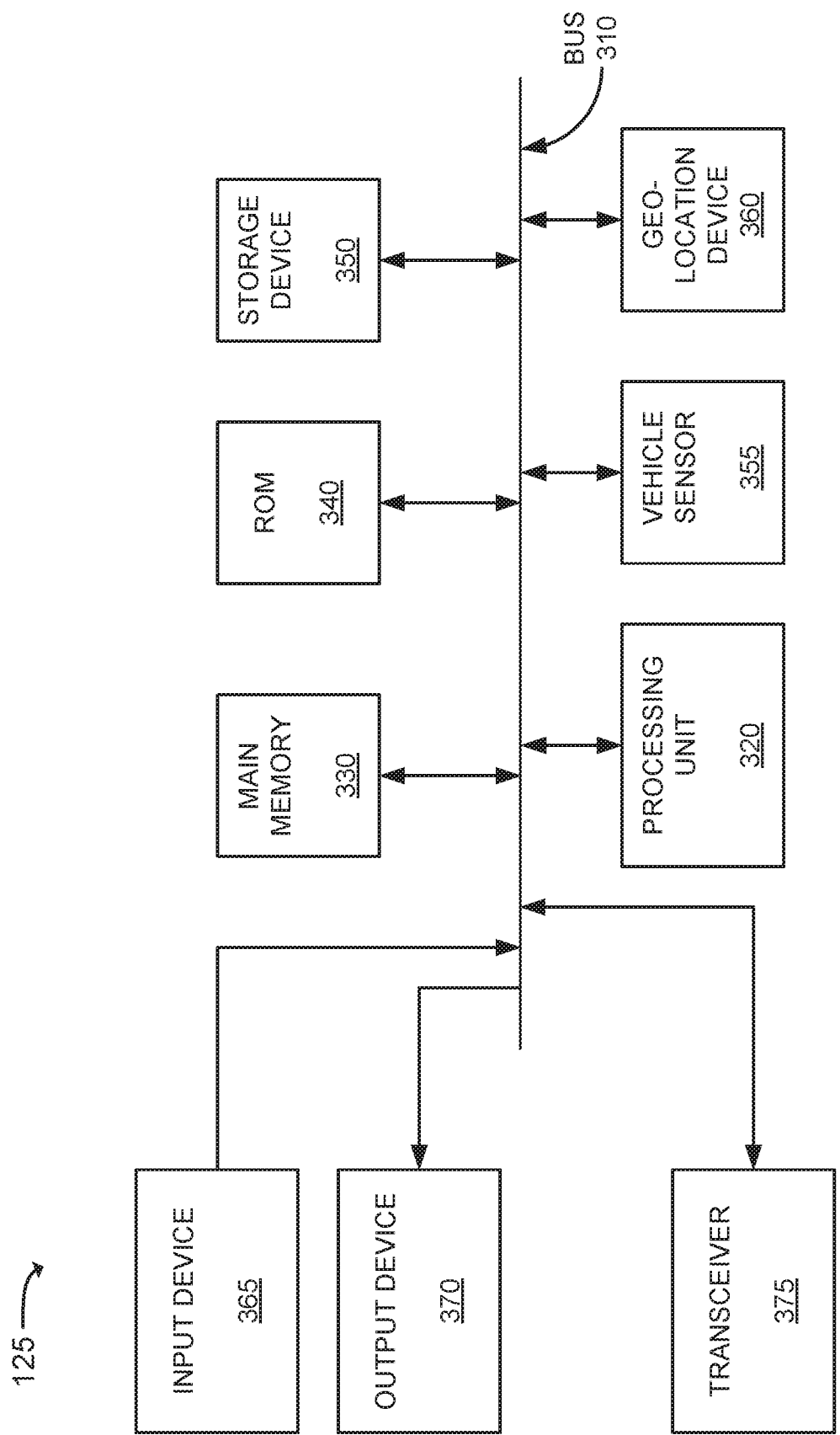
FIG. 3 is a diagram that depicts exemplary components of an autonomous vehicle.

FIG. 3 is a diagram that depicts exemplary components of an autonomous vehicle 125. Telemetry server 210, global telemetry DB 230, management portal server 235, global token repository 240, token server 220, BM-SC 255, MBMS-GW 260, MME 265, and MCE 270 may each include a device configured similarly to vehicle 125 shown in FIG. 3, possibly with some variations in components and/or configuration. Vehicle 125 may include a bus 310, a processing unit 320, a main memory 330, a read only memory (ROM) 340, a storage device 350, a vehicle sensor 355, a geo-location device 360, an input device 365, an output device 370, and a transceiver 375.

Bus 310 includes a path that permits communication among the components of autonomous vehicle 125. Processing unit 320 may include one or more processors or microprocessors, or processing logic (e.g., circuitry), which may execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic, flash memory, and/or optical recording medium. Main memory 330, ROM 340 and storage device 350 may each be a "tangible and/or non-transitory computer-readable storage medium."

Vehicle sensor 355 may include one or more sensor devices that sense various internal and/or external parameters associated with autonomous vehicle 125. For example, sensor 355 may include a digital compass that determines a current heading of vehicle 125, one or more radar units that sense an environment in proximity to vehicle 125, one or more lasers for determining a distance to obstacles, vehicles, and structures in proximity to vehicle 125, image/video cameras for taking images or video of the environment in proximity to vehicle 125, and/or an odometer that measures a distance that vehicle 125 has traveled. Vehicle sensor 355 may include one or more other types of sensor devices.

Geo-location device 360 includes a device that determines a geographic location of autonomous vehicle 125. In one implementation, geo-location device 360 includes a Global Positioning System (GPS) device that determines, using the GPS satellite system, a geographic position of autonomous vehicle 125. The geographic position may be tracked over time to determine a velocity and/or a heading of vehicle 125.

Input device 365 may include one or more mechanisms that permit an operator to input information to vehicle 125, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 365 and output device 370 may be implemented as a graphical user interface (GUI) (e.g., a touch screen GUI that uses any type of touch screen device) that displays GUI information and which receives user input via the GUI.

Transceiver 375 may include one or more transceivers (e.g., transmitters and/or receivers) that enable autonomous vehicle 125 to communicate with other devices and/or systems. For example, transceiver 375 may include a wireless transceiver for communicating via an eNB 280 of wireless network 115.

The configuration of components of autonomous vehicle 125 shown in FIG. 3 is for illustrative purposes. Other configurations may be implemented. Therefore, vehicle 125 may include additional, fewer and/or different components, arranged in a different configuration, than depicted in FIG. 3. Telemetry server 210, global telemetry DB 230, management portal server 235, global token repository 240, and token server 220 may include the same, or similar components, to those shown in FIG. 3, but may omit vehicle sensor 355 and/or geo-location device 360. Additionally, BM-SC 255, MBMS-GW 260, MME 265, and MCE 270 may include the same, or similar, components to those shown in FIG. 3, but may omit input device 365, output device 370 (e.g., such as a keyboard or a display monitor), vehicle sensor 355, and/or geo-location device 360.

Figure 4:
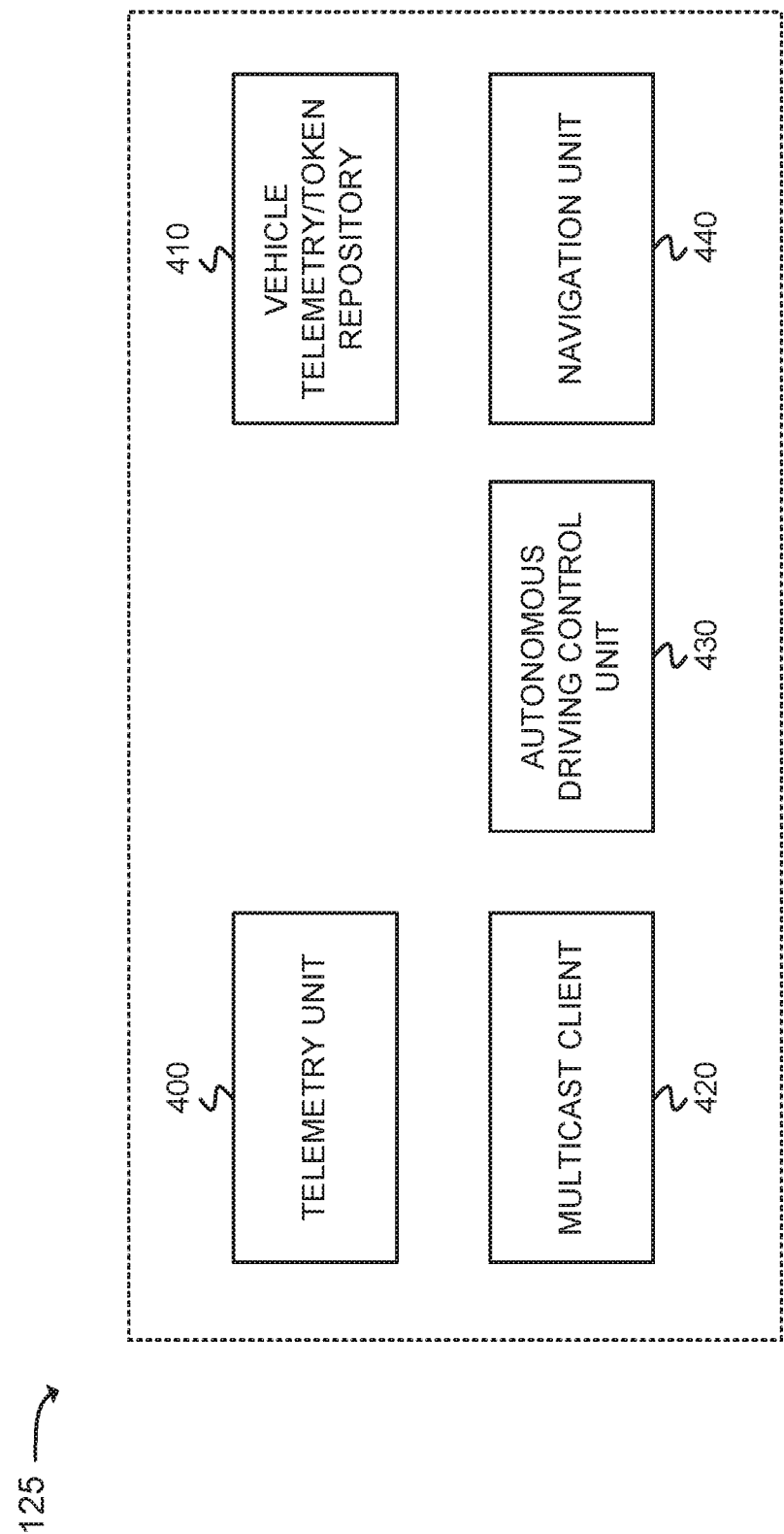
FIG. 4 is a diagram that depicts functional components of an autonomous vehicle.

FIG. 4 is a diagram that depicts functional components of autonomous vehicle 125. The functional components of autonomous vehicle 125 shown in FIG. 4 may be implemented by processing unit 320 and main memory 330, ROM 340 and/or storage device 350, in conjunction with other components of vehicle 125 (e.g., vehicle sensor 355, geo-location device 360, transceiver 375). The functional components of vehicle 125 include a telemetry unit 400, a vehicle telemetry/token repository 410, a multicast client 420, an autonomous driving control unit 430, and a navigation unit 440.

Telemetry unit 400 collects vehicle sensor data from vehicle sensor 355, and vehicle operational data associated with the ongoing operation of the vehicle. Telemetry unit 400 stores the collected data in vehicle telemetry/token repository 410. Vehicle telemetry/token repository 410 includes a data structure that stores telemetry data received from telemetry unit 400, and multicast autonomous control tokens received at multicast client 420 via wireless network 115. Repository 410 may be stored in main memory 330, ROM 340, and/or storage device 350. Multicast client 420 listens to one or more channels of wireless network 115, via transceiver 375, so as to receive multicast autonomous vehicle control tokens. Multicast client 420, upon receipt of an autonomous vehicle control token over the wireless network 115, stores the vehicle control token in repository 410.

Autonomous driving control unit 430 includes a control system that automatically controls driving, and operation, of the vehicle based on the vehicle sensor data and vehicle operational data collected by telemetry unit 400. Autonomous driving control unit 430 additionally controls the driving, and operation, of the vehicle based on autonomous vehicle control tokens received by multicast client 420 via wireless network 115. Navigation unit 440 includes a system that uses geographic position data obtained from geo-location device 360, and mapping information stored in memory, to navigate from a starting point to a destination point. Navigation unit 400 provides navigation information to autonomous driving control unit 430 to enable control unit 430 to formulate driving control instructions that cause the autonomous vehicle 125 to drive from the starting point to the destination point.

The configuration of the functional components of autonomous vehicle 125 shown in FIG. 4 is for illustrative purposes. Other configurations may be implemented. Therefore, autonomous vehicle 125 may include additional, fewer and/or different functional components than depicted in FIG. 4.

Figure 5:
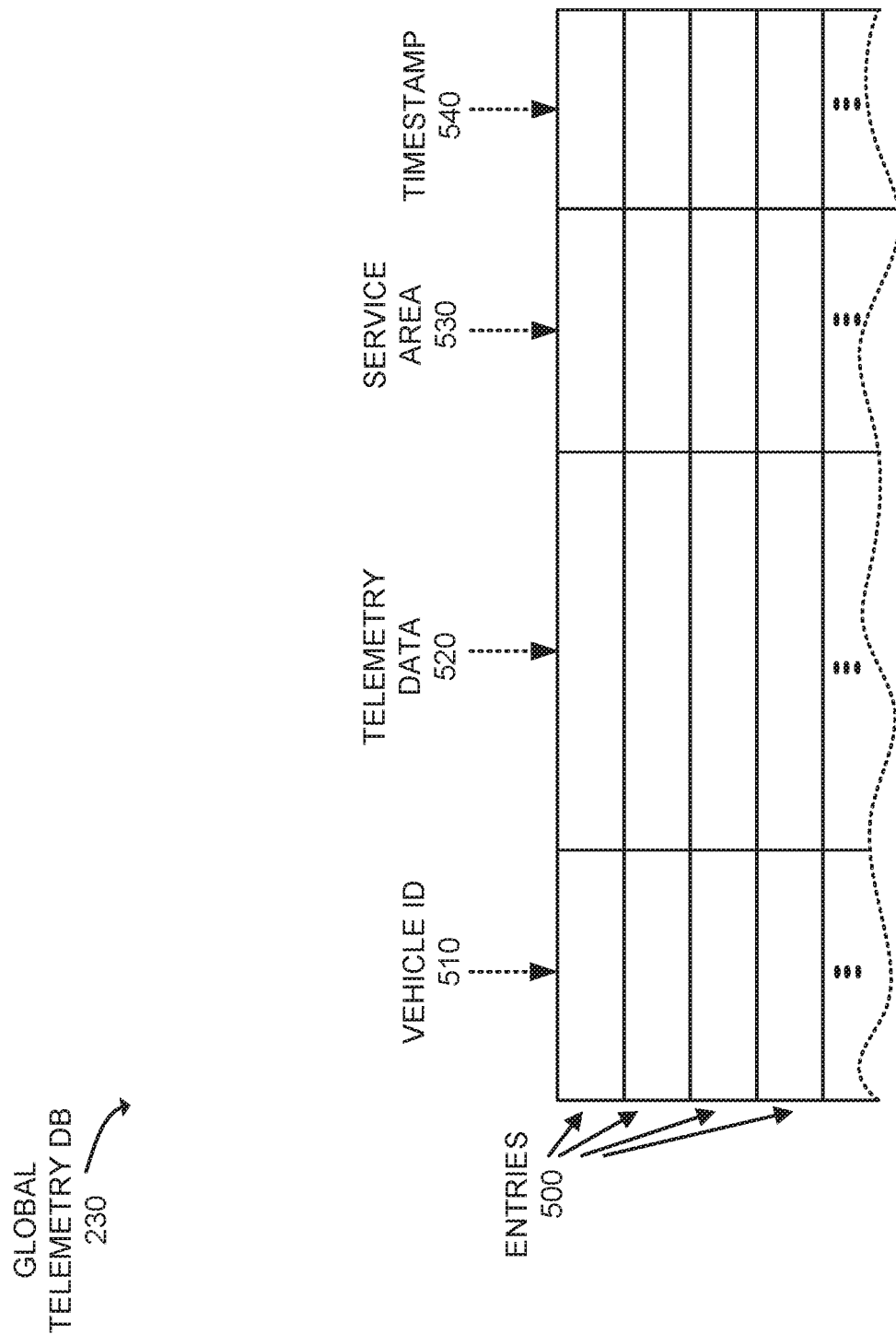
FIG. 5 is a diagram that depicts an exemplary implementation of the global telemetry database of FIG. 2A.

FIG. 5 is a diagram that depicts an exemplary implementation of global telemetry DB 230. As shown, a data structure of global telemetry DB 230 may include multiple entries 500, with each entry 500 including a vehicle ID field 510, a telemetry data field 520, a service area field 530, and a timestamp field 540.

Vehicle ID field 510 stores a globally unique identifier (GUID) for an autonomous vehicle 125 from which telemetry data in field 520 has been transmitted. Telemetry data field 520 stores telemetry data, and possibly other data, associated with the autonomous vehicle 125 identified in field 510. Service area field 530 stores a service area associated with the location of the autonomous vehicle 125 identified in field 510 at a time at which the telemetry data, stored in field 520, was transmitted from autonomous vehicle 125. The service area may correspond, for example, to an eMBMS synchronization area 275, as depicted in FIG. 2B. The service area may, however, correspond to other types of geographical (e.g., a geographic grid pattern, with each portion of the grid being a particular service area) and/or geopolitical designations (e.g., by city, township, county, state, etc.). Timestamp field 540 stores a timestamp associated with a time at which the telemetry data, stored in field 520, was transmitted from the autonomous vehicle 125 identified in field 510.

To locate a particular entry of global telemetry DB 230, DB 230 may be indexed with, for example, a vehicle ID to locate an entry 500 having a matching vehicle ID field 510. When such an entry 500 is located, data may be stored in one or more fields 520, 530, and/or 540 of the entry 500, or data may be retrieved from one or more fields 520, 530, and/or 540 of the entry 500. Other fields of an entry 500, instead of vehicle ID field 510, may alternatively be used for indexing DB 230.

Figure 6:
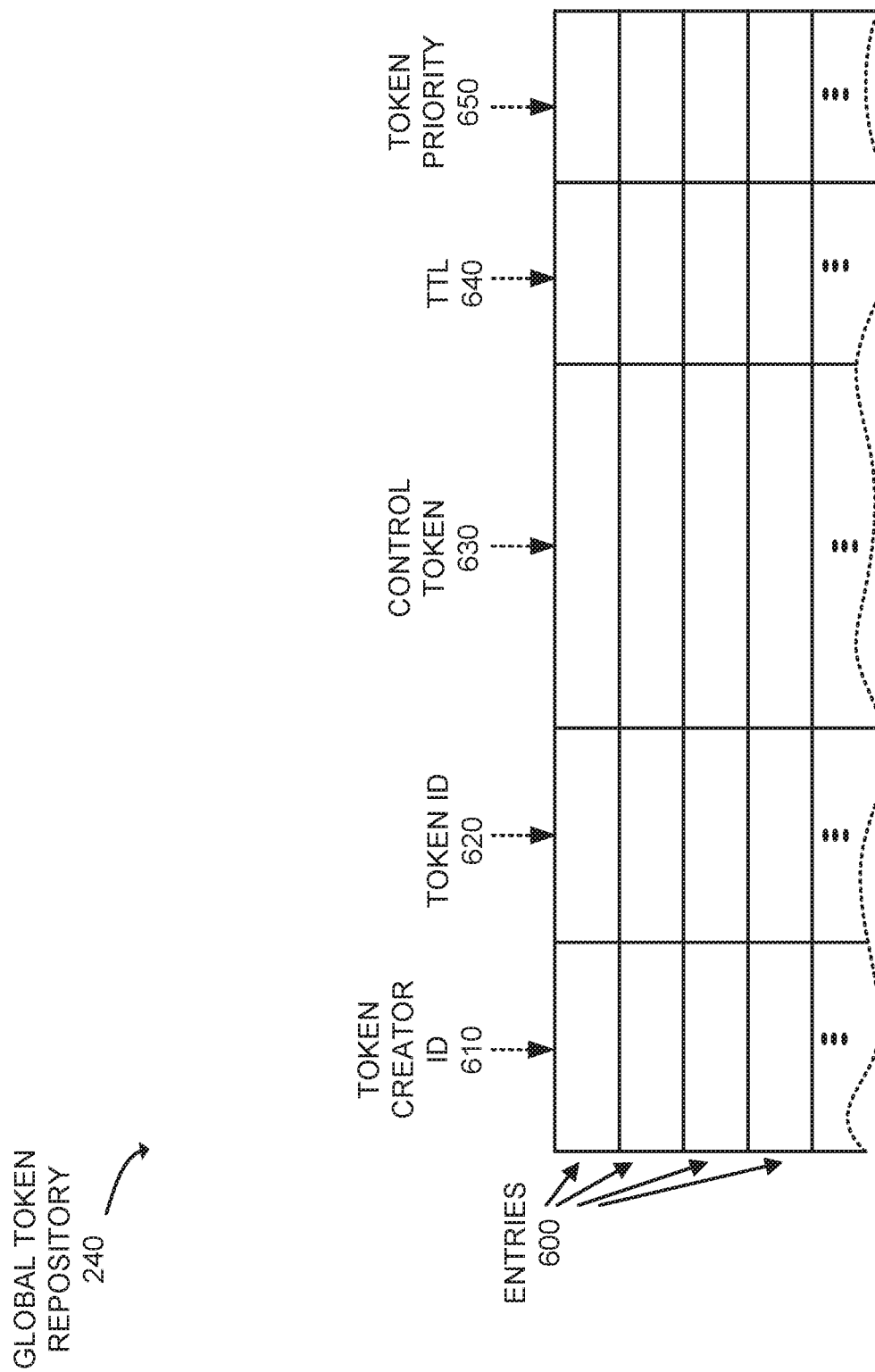
FIG. 6 is a diagram that depicts an exemplary implementation of the global token repository of FIG. 2A.

FIG. 6 is a diagram that depicts an exemplary implementation of global token repository 240. As shown, a data structure of repository 240 may include multiple entries 600, with each entry 600 including a token creator ID field 610, a token ID field 620, a control token field 630, a time-to-live (TTL) field 640, and a token priority field 650. Token creator ID field 610 stores a GUID for an operator 100 that has created the control token, stored in corresponding field 630, using management portal server 235. Token ID field 620 stores a GUID for the control token stored in corresponding field 630. Control token field 630 stores a control token identified by the GUID stored in corresponding field 610. TTL field 640 stores a time-to-live value associated with the control token stored in field 630. The time-to-live value indicates a time at which the control token expires, and is no longer valid for multicasting to autonomous vehicles 125. When a control token expires, as indicated by the value stored in field 640, the entire contents of the corresponding entry 600 may be deleted from repository 240. Token priority field 650 stores a priority value indicating a relative importance of the control token stored in the corresponding field 630. The priority value may be used for establishing a scheduling precedence for multicasting the control token among other control tokens to be multicast. For example, a high priority value stored in field 650 indicates that the corresponding control token should be multicast by token server 220 prior to control tokens from other control tokens having lower priority values. The priority value may include multiple different priority levels, such as standard priority and high priority.

To locate a particular entry of repository 240, repository 240 may be indexed with, for example, a token ID to locate an entry 600 having a matching token ID stored in field 620. When such an entry 600 is located, data may be stored in one or more fields 610, 620, 630, 640, and/or 650 of the entry 600, or data may be retrieved from one or more fields 610, 620, 630, 640, and/or 640 of the entry 600. Other fields of an entry 600, instead of token ID field 620, may alternatively be used for indexing repository 240.

Global telemetry DB 230 and global token repository 240 are depicted in FIGS. 5 and 6 as including tabular data structures with certain numbers of fields having certain content. The tabular data structures of DB 230 and repository 240 shown in FIGS. 5 and 6, however, are for illustrative purposes. Other types of data structures may alternatively be used. The number, types, and content of the entries and/or fields in the data structures of DB 230 and repository 240 illustrated in FIGS. 5 and 6 are also for illustrative purposes. Other data structures having different numbers of, types of and/or content of, the entries and/or the fields may be implemented. Therefore, global telemetry DB 230 and global token repository 240 may include additional, fewer and/or different entries and/or fields than those depicted in FIGS. 5 and 6.

Figure 7:
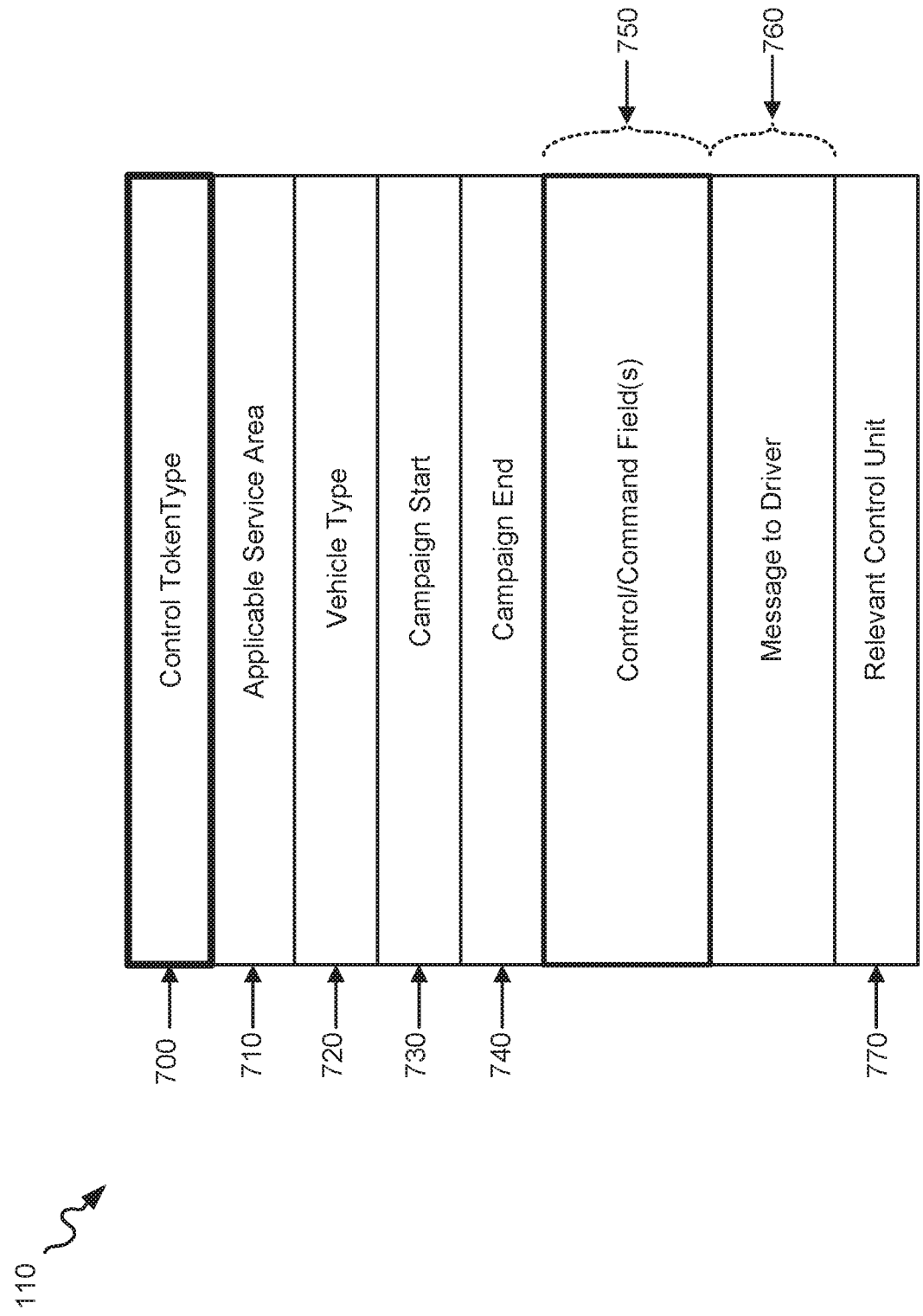
FIG. 7 illustrates an autonomous vehicle control token according to an exemplary embodiment.

FIG. 7 illustrates an exemplary autonomous vehicle control token 110. Autonomous vehicle control token 110 may include a control token type field 700, an applicable service area field 710, a vehicle type field 720, a campaign start date and/or time field 730, a campaign end date and/or time field 740, a control/command field(s) 750, a message to driver field 760, and a relevant control unit field 770.

Control token type field 700 includes data that identifies a particular type, of multiple different types, of autonomous vehicle control tokens. For example, the multiple different types of control tokens may include a speed limit token, a re-route token, an enabling/disabling autonomous operation token, and a speed increase/decrease token. The speed limit token establishes a minimum speed and a maximum speed for the autonomous vehicle. The re-route token specifies an alternative route that the autonomous vehicle is to follow. The enabling/disabling autonomous operation token causes autonomous operation to either be engaged, or disengaged, at the vehicle. The speed increase/decrease token causes the vehicle to increase its speed by a step up value, or causes the vehicle to decrease its speed by a step down value. Other types of autonomous vehicle control tokens, that control one or more aspects of the autonomous operation of autonomous vehicles 125 and are not described here, may be indicated in control token type field 700.

Applicable service area field 710 includes an identifier that identifies the particular service area or areas for which the control token 110 is to be applicable. The applicable service area may be one or more eMBMS synchronization areas 275, one or more particular geographic regions, and/or one or more geo-political regions (e.g., cities, townships, counties, states, etc.). Various different types of service areas may be defined for use in field 710.

Vehicle type field 720 indicates a class of vehicle to which the control token is to be applicable. The classes of vehicle may include, for example, a consumer class, a commercial class, or a fleet class. A consumer class refers to vehicles owned and/or operated by private individuals for their own personal use. A commercial class refers to vehicles owned and/or operated by commercial entities for commercial or business purposes. A fleet class refers to a fleet of vehicles owned and/or operated for the benefit of an entity that may or may not be commercial in nature. For example, school buses, police vehicles, and military vehicles may be designated as belonging to a fleet class.

Campaign start date and/or time field 730 identifies a date (e.g., month, day, year) and/or a time (hour, minute, second) at which the control commands contained in control token 110 are to be applied to the operation of the vehicle 125. Campaign end date and/or time field 740 identifies a date (e.g., month, day, year) and/or a time (hour, minute, second) at which the control commands, previously applied at the time specified by field 730, are to be discontinued from controlling the operation of the vehicle 125.

Control/command field(s) 750 identify one or more commands or instructions to be applied to the operation/driving of the vehicle 125. Message to driver field 760 includes text associated with a message to be displayed and/or played back in audio or video form to the driver of the vehicle 125. The message may relate to what controls are being applied to the vehicle 125. Relevant control unit field 770 identifies one or more units or devices of vehicle 125 that are to be controlled by commands or instructions contained in field(s) 750. The units or devices may include, for example, autonomous driving control unit 430, navigation unit 440, telemetry unit 400, or multicast client 420.

The fields of control token 110, depicted in FIG. 7, are for illustrative purposes. Other fields may be included in control token 110. Therefore, autonomous vehicle control token 110 may include additional, fewer and/or different fields than those depicted in FIG. 7. Furthermore, the fields of control token 110 described with respect to FIG. 7 may include a different content than that described. For example, control token 110 may include one or more fields directed to identifying, and authenticating, the entity from which control token 110 originates.

Figure 8A:
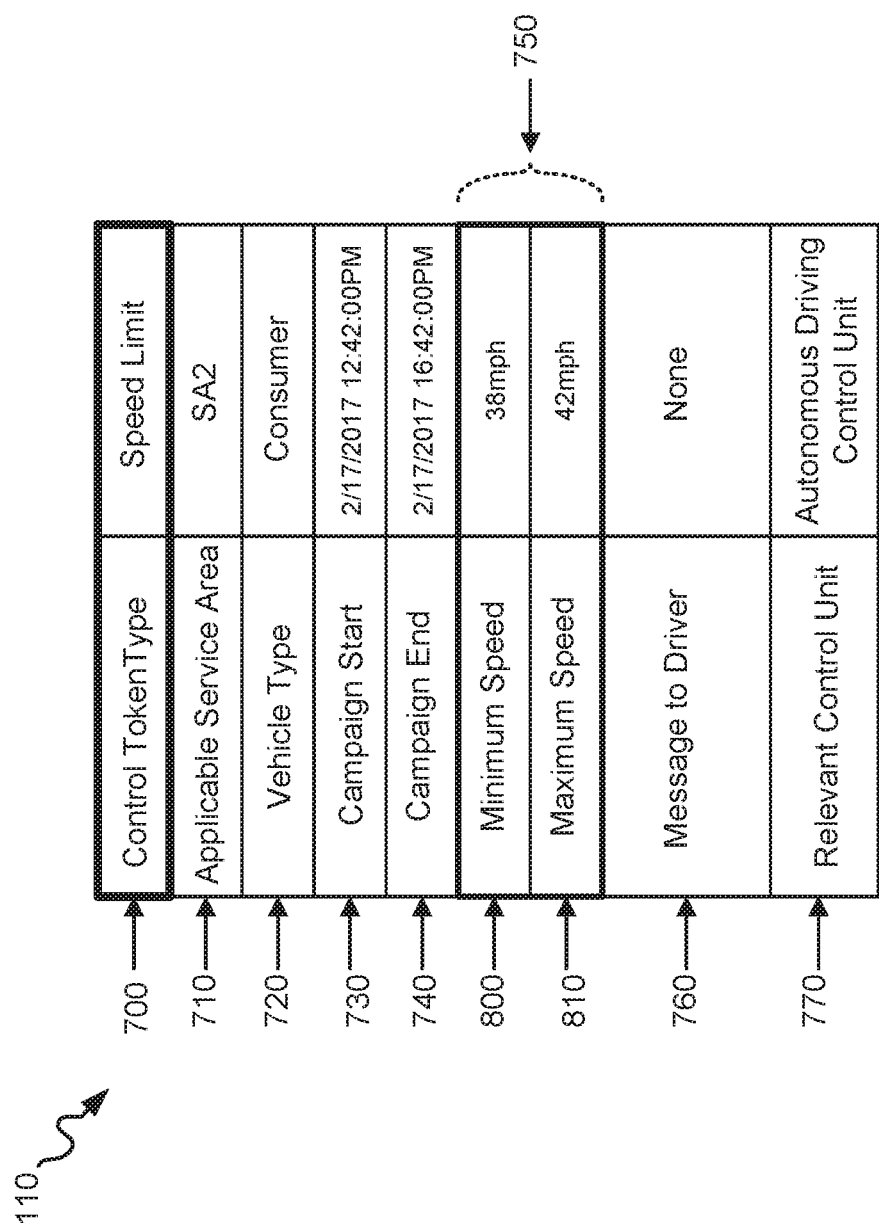
FIGS. 8A-8D are diagrams that depict four different specific examples of the autonomous vehicle control token of FIG. 7.
Figure 8B:
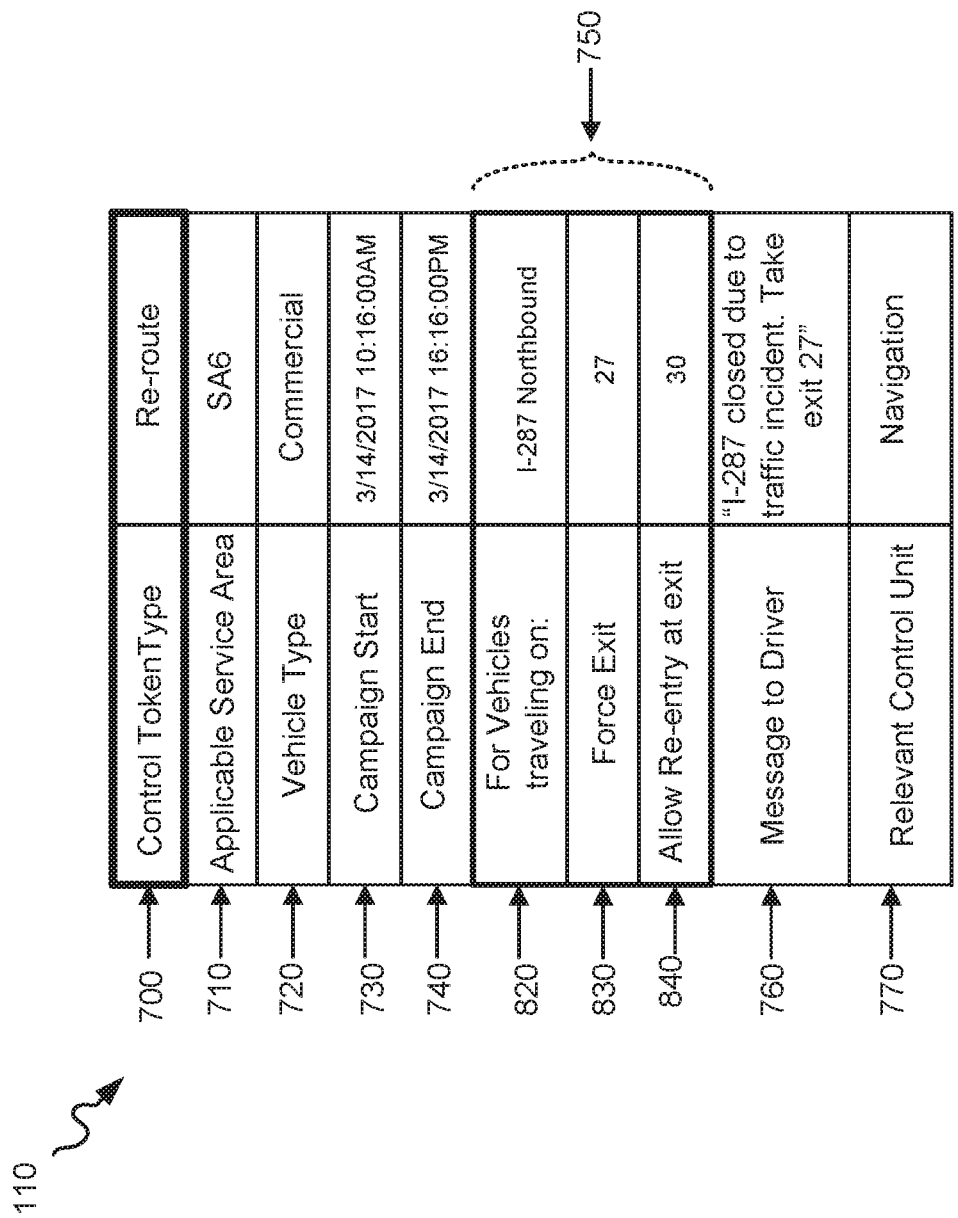
Figure 8C:
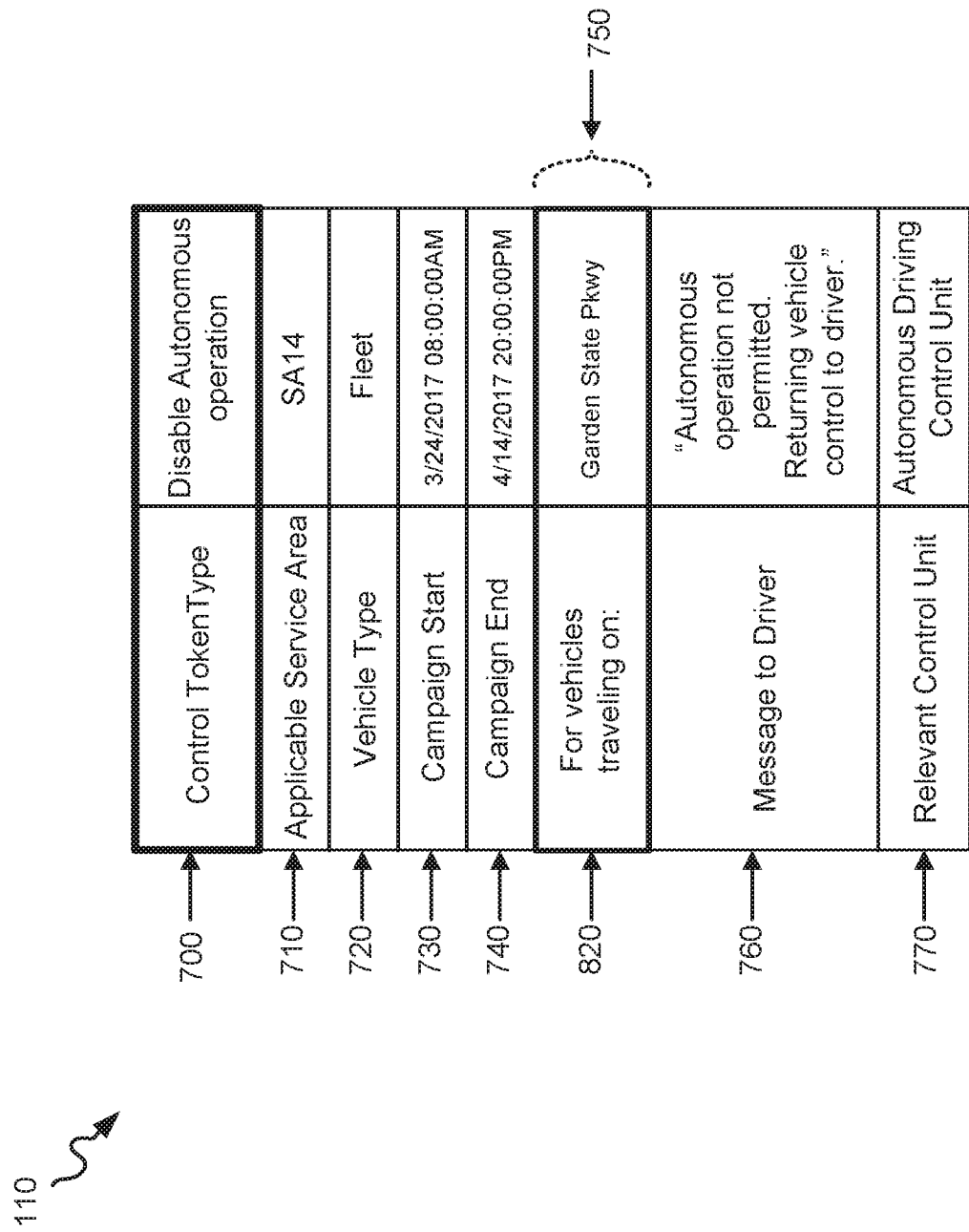
Figure 8D:
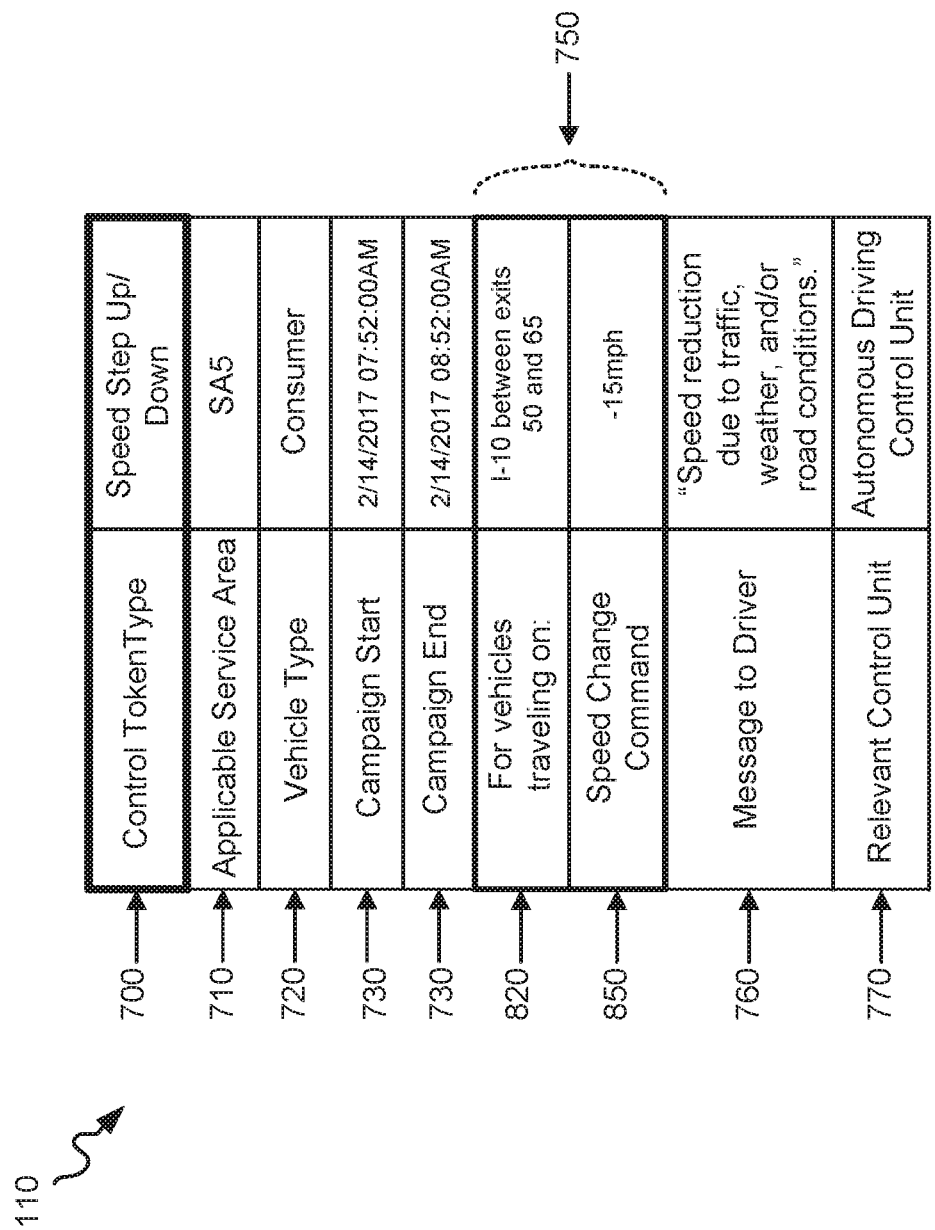

FIGS. 8A-8D depicts four different specific examples of the control token 110 of FIG. 7. FIG. 8A illustrates an example of a control token 110 having a speed limit control token type, FIG. 8B illustrates an example of a control token 110 having a re-route control token type, FIG. 8C illustrates an example of a control token 110 having an enabling/disabling autonomous operation control token type, and FIG. 8D illustrates an example of a control token 110 having a speed increase/decrease control token type.

As shown in the first example control token 110 of FIG. 8A, control token type field 700 indicates a speed limit control token type. Applicable service area field 710 identifies service area 2 (SA2) as the service area to which the control token 110 is to be applied. Vehicle type field 720 identifies that the control token is to be applied to consumer class vehicles. Campaign start field 730 indicates that the control specified by the control token 110 is to start on Feb. 17, 2017 at 12:42:00 PM. Campaign end field 740 indicates that the control specified by the control token 110 is to end on Feb. 17, 2017 at 16:42:00 PM, for a duration of four hours. As shown in FIG. 8A, the control/command field(s) 750 of control token 110 having a speed limit control token type includes a minimum speed field 800, and a maximum speed field 810. In the specific example depicted in FIG. 8A, the minimum speed field 800 indicates a minimum speed of 38 miles per hour (mph), and the maximum speed field 810 indicates a maximum speed of 42 mph. Further, message to driver field 760 indicates that no message is to be presented to the driver of vehicle 125. Relevant control unit field 770 indicates that autonomous driving control unit 430 is the unit or device of vehicle 125 to which the control/commands of fields 750 are to be applied.

As shown in the second example control token 110 of FIG. 8B, control token type field 700 indicates a re-route control token. Applicable service area field 710 identifies service area 6 (SA6) as the service area to which the control token 110 is to be applied. Vehicle type field 720 identifies that the control token is to be applied to commercial class vehicles. Campaign start field 730 indicates that the control specified by the control token 110 is to start on Mar. 14, 2017 at 10:16:00 AM. Campaign end field 740 indicates that the control specified by the control token 110 is to end on Mar. 14, 2017 at 16:16:00 PM, for a duration of eight hours. As shown in FIG. 8B, the control/command field(s) 750 of control token 110 having a re-route control token type 700 includes a "for vehicles traveling on:" field 820, a "force exit" field 830, and an "allow re-entry at exit" field 840.

In the specific example depicted in FIG. 8B, the "for vehicles traveling on:" field 820 indicates the particular roadway, and direction, on which the re-route control token applies. In this example, the "for vehicles traveling on:" field 820 indicates "Interstate 287 Northbound." The "force exit" field 830 indicates a roadway exit at which the vehicle is to be re-routed by exiting the particular roadway indicated in field 820. In this example, the "force exit" field 830 indicates exit 27 on Interstate 287. The "allow re-entry at exit" field 840 indicates the roadway mile marker on-ramp at which the vehicle may re-enter the roadway indicated in field 820. In this example, the "allow re-entry at exit" field indicates mile marker 30. The message to driver field 760, in the example of FIG. 8B, indicates that Interstate 287 is closed due to a traffic incident, and that the vehicle is going to be re-routed via exit 27. The relevant control unit field 770, in the example of FIG. 8B, indicates that navigation unit 440 is the unit/device to which the commands of fields 750 are applicable.

As shown in the third example control token 110 of FIG. 8C, control token type field 700 indicates a "disable autonomous operation" control token. Applicable service area field 710 identifies service area 14 (SA14) as the service area to which the control token 110 is to be applied. Vehicle type field 720 identifies that the control token is to be applied to fleet class vehicles. Campaign start field 730 indicates that the control specified by the control token 110 is to start on Mar. 24, 2017 at 08:00:00 AM. Campaign end field 740 indicates that the control specified by the control token 110 is to end on Apr. 14, 2017 at 20:00:00 PM. As shown in FIG. 8C, the control/command field(s) 750 of control token 110 having a "disable autonomous operation" control token type 700 includes a "for vehicles traveling on:" field 820.

In the specific example depicted in FIG. 8C, the "for vehicles traveling on:" field 820 indicates the particular freeway, and direction, on which the re-route control token applies. In this example, the "for vehicles traveling on:" field 820 indicates the "Garden State Parkway." The message to driver field 760, in the example of FIG. 8C, indicates that autonomous operation of vehicle 125 is not permitted, and manual control is being returned to the driver of vehicle 125. The relevant control unit field 770, in the example of FIG. 8C, indicates that autonomous driving control unit 430 is the unit/device to which the commands of fields 750 are applicable.

As shown in the fourth example control token 110 of FIG. 8D, control token type field 700 indicates a "speed step up/down" control token. Applicable service area field 710 identifies service area 5 (SA5) as the service area to which the control token 110 is to be applied. Vehicle type field 720 identifies that the control token is to be applied to consumer class vehicles. Campaign start field 730 indicates that the control specified by the control token 110 is to start on Feb. 14, 2017 at 07:52:00 AM. Campaign end field 740 indicates that the control specified by the control token 110 is to end on Feb. 14, 2017 at 08:52:00 AM.

As shown in FIG. 8D, the control/command field(s) 750 of control token 110 having a "speed step up/down" control token type 700 includes a "for vehicles traveling on:" field 820, and a speed change command field 850. In the specific example depicted in FIG. 8D, the "for vehicles traveling on:" field 820 indicates the particular roadway, and direction, on which the re-route control token applies. In this example, the "for vehicles traveling on:" field 820 indicates Interstate 10 between exits 50 and 65, and the speed change command field 850 indicates that the speed of vehicle 125 is to be reduced 15 mph. The message to driver field 760, in the example of FIG. 8D, indicates that the speed of vehicle 125 is being reduced due to traffic, weather, and/or road conditions. The relevant control unit field 770, in the example of FIG. 8D, indicates that autonomous driving control unit 430 is the unit/device to which the commands of fields 750 are applicable.

Figure 9:
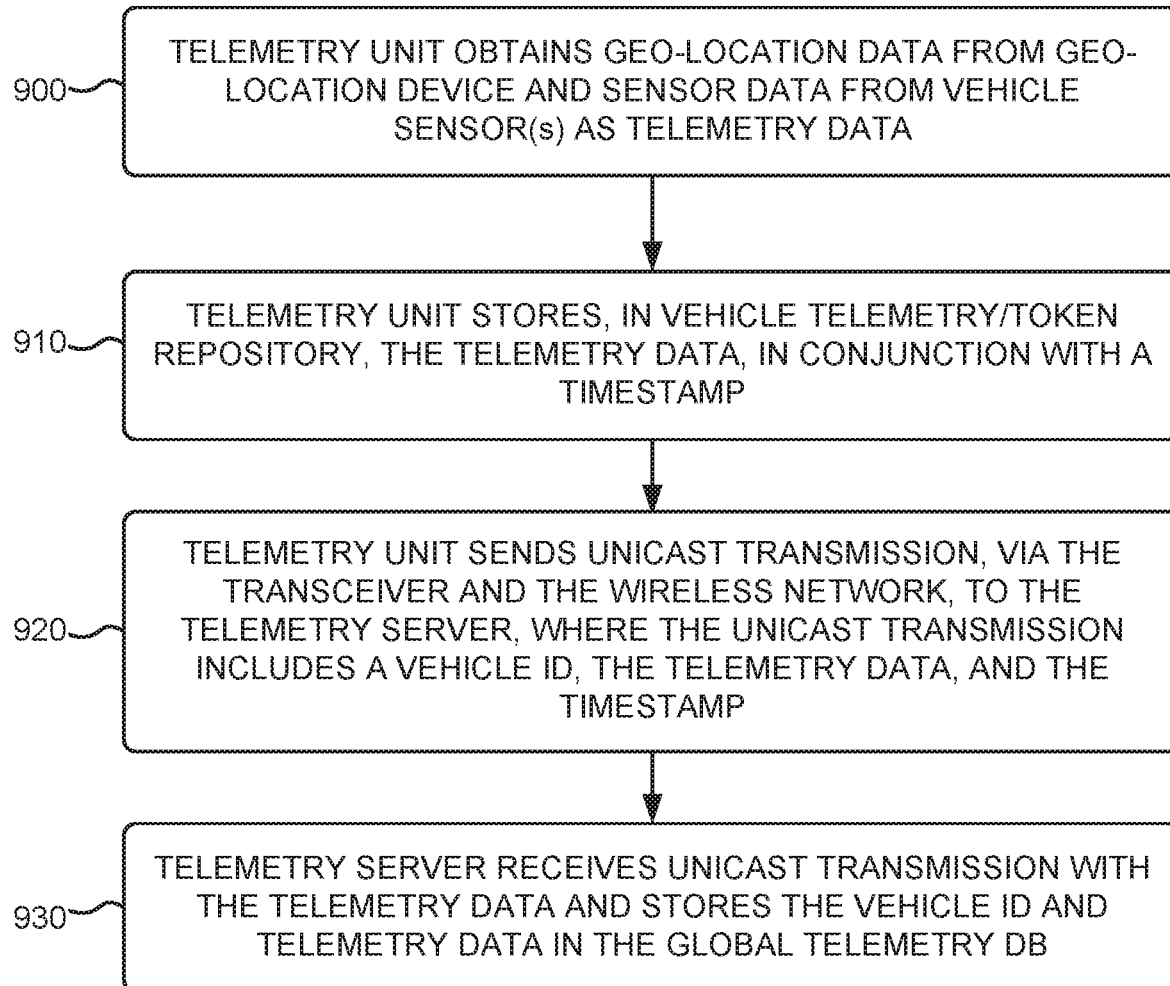
FIG. 9 is a flowchart that illustrates an exemplary process for obtaining telemetry data at an autonomous vehicle, and for transmitting the telemetry data to a telemetry server.

FIG. 9 is a flowchart that illustrates an exemplary process for obtaining telemetry data at an autonomous vehicle 125, and for transmitting the telemetry data to telemetry server 210. The exemplary process of FIG. 9 may be implemented by telemetry unit 400 of vehicle 125, in conjunction with telemetry server 210. The exemplary process of FIG. 9 is described below with reference to the exemplary messaging diagram of FIG. 10.

Figure 10:
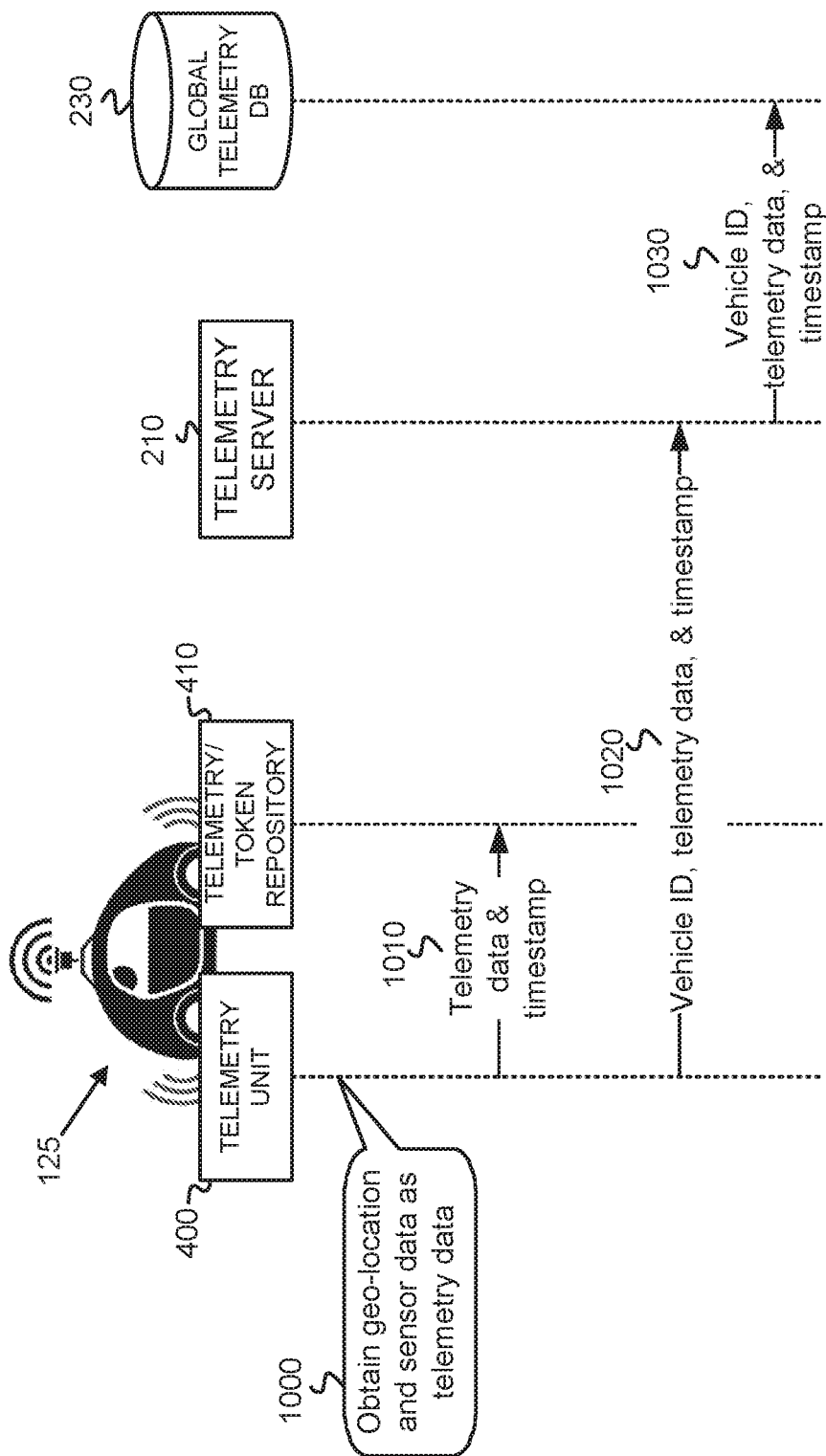
FIG. 10 is an exemplary messaging diagram associated with the exemplary process of FIG. 9.

The exemplary process includes telemetry unit 400 obtaining, as telemetry data, geo-location data from geo-location device 360 and sensor data from vehicle sensor 355 (block 900), and storing, in vehicle telemetry/token repository 410, the telemetry data in conjunction with a timestamp (block 910). Telemetry unit 400 may pull geo-location data, corresponding to a current geo-location of autonomous vehicle 125, from geo-location device 360, and one or more types of sensor data from the various sensors of vehicle sensor 355. Upon receipt of the geo-location and sensor data, telemetry unit 400 may obtain a current timestamp (e.g., current date and time), and store the geo-location and sensor data as telemetry data in repository 410, along with the timestamp. Referring to FIG. 10, telemetry unit 400 of vehicle 125 is depicted as obtaining 1000 the geo-location and sensor data as telemetry data, and sending 1010 the telemetry data, along with a timestamp, to repository 410.

Telemetry unit 400 sends a unicast transmission, via transceiver 375 and wireless network 115, to telemetry server 210, where the unicast transmission includes a vehicle ID, the telemetry data obtained in block 900, and the timestamp (block 920). Each autonomous vehicle 125 may be assigned a globally unique vehicle ID, and the vehicle ID may then be stored locally (e.g., in memory 330, ROM 340, or storage device 350). Processing unit 320 may execute an application that keeps track of a current time and generates timestamps upon request. The application may use an internal clock of processing unit 320 for maintain an accurate record of time, or may use an external time standard (e.g., obtained from wireless network 115, or from the GPS system) for maintaining an accurate record of time. FIG. 10 depicts telemetry unit 400 of vehicle 125 sending a unicast transmission 1020, which includes a vehicle ID, telemetry data, and a timestamp, to telemetry server 210.

Telemetry server 210 receives the unicast transmission with the telemetry data, and stores the vehicle ID and the telemetry data, from the unicast transmission, in global telemetry DB 230 (block 930). Telemetry server 210 may receive the unicast transmission, retrieve the vehicle ID, telemetry data, and timestamp, from the transmission, and then stores the vehicle ID in field 510 of an entry 500, the telemetry data in field 520 of the entry 500, and the timestamp in field 540 of the entry 500. Additionally, the unicast transmission may identify the service area from which the transmission was received, such as, for example, the service area in wireless network 115 from which the unicast transmission was transmitted from the autonomous vehicle 125. Telemetry server 210 may store the service area retrieved from the unicast transmission in field 530 of the entry in which data has been stored in fields 510, 520, and 540. FIG. 10 depicts telemetry server 210 storing 1030 the received vehicle ID, telemetry data, and timestamp in global telemetry DB 230.

The exemplary process of FIG. 9 may be repeated, at each autonomous vehicle 125, at certain intervals (e.g., periodic intervals), or may be executed on-demand (e.g., at a request from telemetry server 210).

Figure 11:
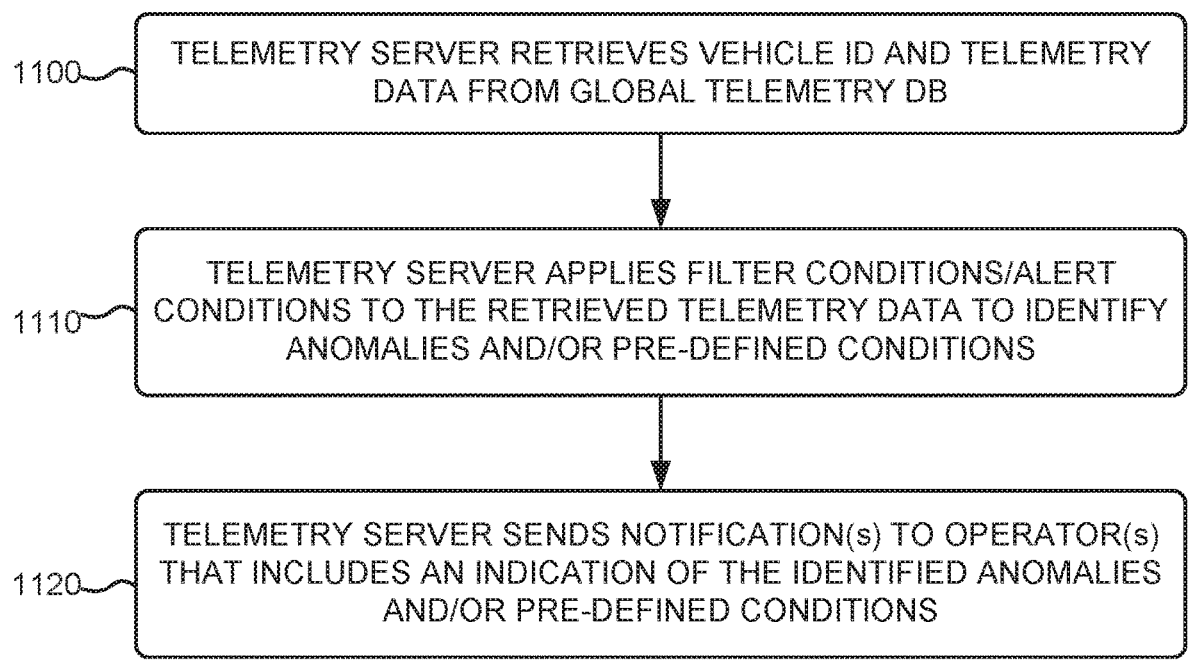
FIG. 11 is a flowchart that illustrates an exemplary process for analyzing telemetry data stored at a global telemetry database to determine the occurrence of anomalies and/or pre-defined filter conditions.

FIG. 11 is a flowchart that illustrates an exemplary process for analyzing telemetry data stored at global telemetry DB 230 to determine the occurrence of anomalies and/or pre-defined filter conditions. The exemplary process of FIG. 11 may be implemented by telemetry server 210. The exemplary process of FIG. 11 is described below with reference to the exemplary messaging diagram of FIG. 12.

Figure 12:
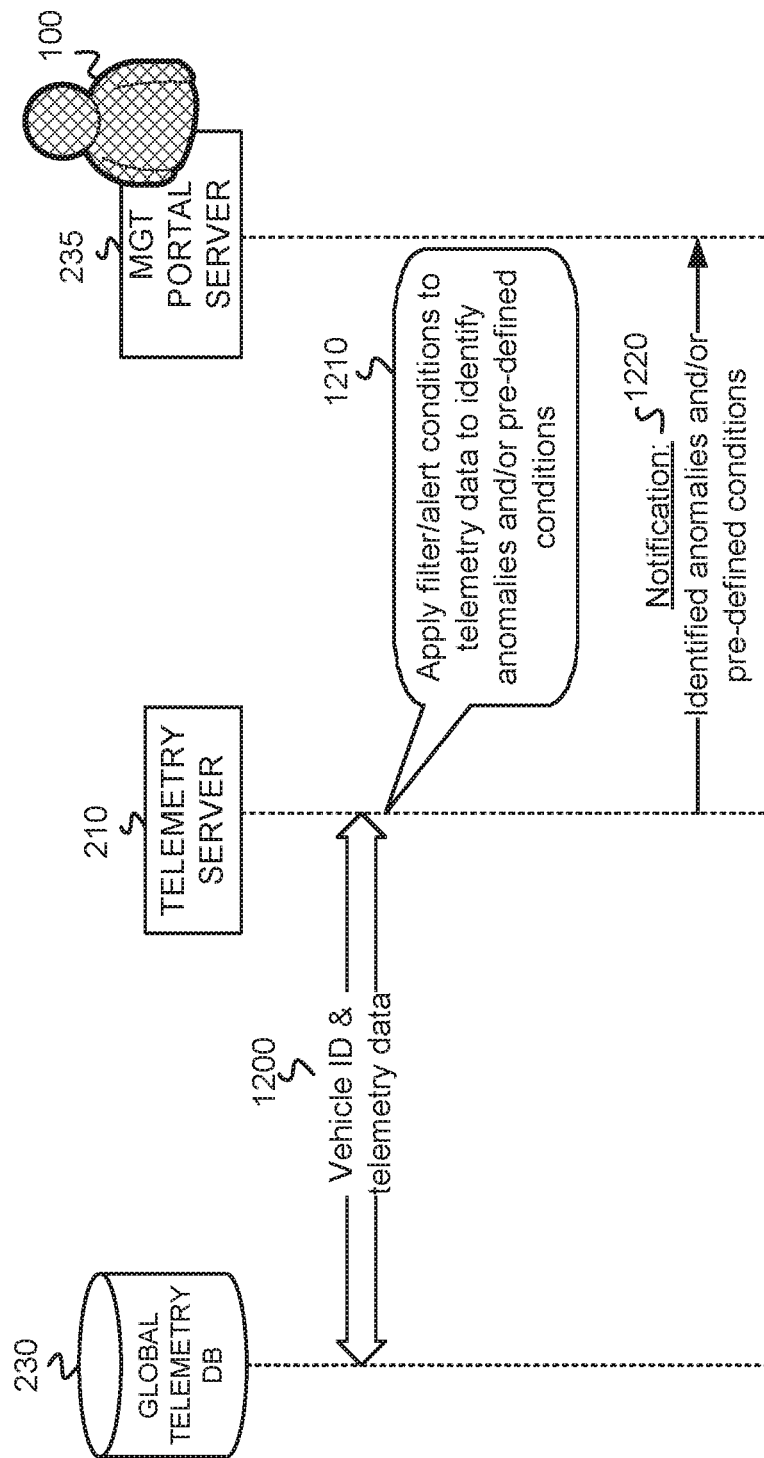
FIG. 12 is an exemplary messaging diagram associated with the exemplary process of FIG. 11.

The exemplary process includes telemetry server 210 retrieving a vehicle identifier and telemetry data from global telemetry DB 230 (block 1100). Various types of algorithms may be used for selecting a particular entry 500 of DB 230 from which to retrieve a vehicle ID from field 510. In one implementation, telemetry server 210 sequentially proceeds through DB 230, acting on each entry 500 in sequential order. In another implementation, telemetry server 210 looks for a particular vehicle in the fields 510 of the entries 500 of DB 230. In yet a further implementation, telemetry server 210 may analyze vehicle telemetry data by, for example, service area. In this implementation, telemetry server 210 may identify entries 500 of DB 230 having a particular service area identified in service area field 530, and retrieve the telemetry data and timestamps from fields 520 and 540 of the identified entries 500. FIG. 12 depicts telemetry server 210 retrieving 1200 the vehicle identifier and telemetry data from DB 230.

Telemetry server 210 applies filter conditions and/or alert conditions to the retrieved telemetry data to identify anomalies and/or pre-defined conditions (block 1110). The filter conditions and/or alert conditions may be default conditions (i.e., applied globally to all autonomous vehicle telemetry data), or may be conditions that have been pre-specified by an automotive OEM, by a government entity (e.g., city, county, state, federal), or by a business entity (e.g., an owner of a fleet of shipping trucks). An example of an anomaly includes the identification of an occurrence of a vehicular accident based on the telemetry data. An example of pre-defined conditions includes the identification of a vehicle, from a fleet of vehicles owned by a business entity, which consistently violates the speed limit on a particular section of roadway. FIG. 12 depicts telemetry server 210 applying 1210 filter and/or alert conditions to the telemetry data to identify anomalies and/or pre-defined conditions.

Telemetry server 210 sends a notification(s) to an operator(s) 100 that includes an indication of the identified anomalies and/or pre-defined conditions (block 1120). Telemetry server 210 inserts the identified anomaly(ies) and/or pre-defined condition(s) within an encapsulated message format, and sends the message via public network 250 to the affected operator(s) 100. If the identified anomaly(ies) and/or pre-defined condition(s) affects multiple different operators 100, then the message is multicast to all of the multiple different operators 100. The message may be sent to a management portal server 235 associated with the operator(s) 100. FIG. 12 depicts telemetry server 210 sending a notification message 1220 that includes the identified anomalies and/or pre-defined conditions. The receiving management portal server 235 may handle the notification(s) as described further below with respect to the exemplary process of FIGS. 13A and 13B.

The exemplary process of FIG. 11 may be repeated by telemetry server 210 automatically at certain intervals (e.g., periodic intervals), at certain intervals or time periods prescribed by operator 100 via management portal server 235, or may be executed on-demand (e.g., at a request from operator 100).

Figure 13A:
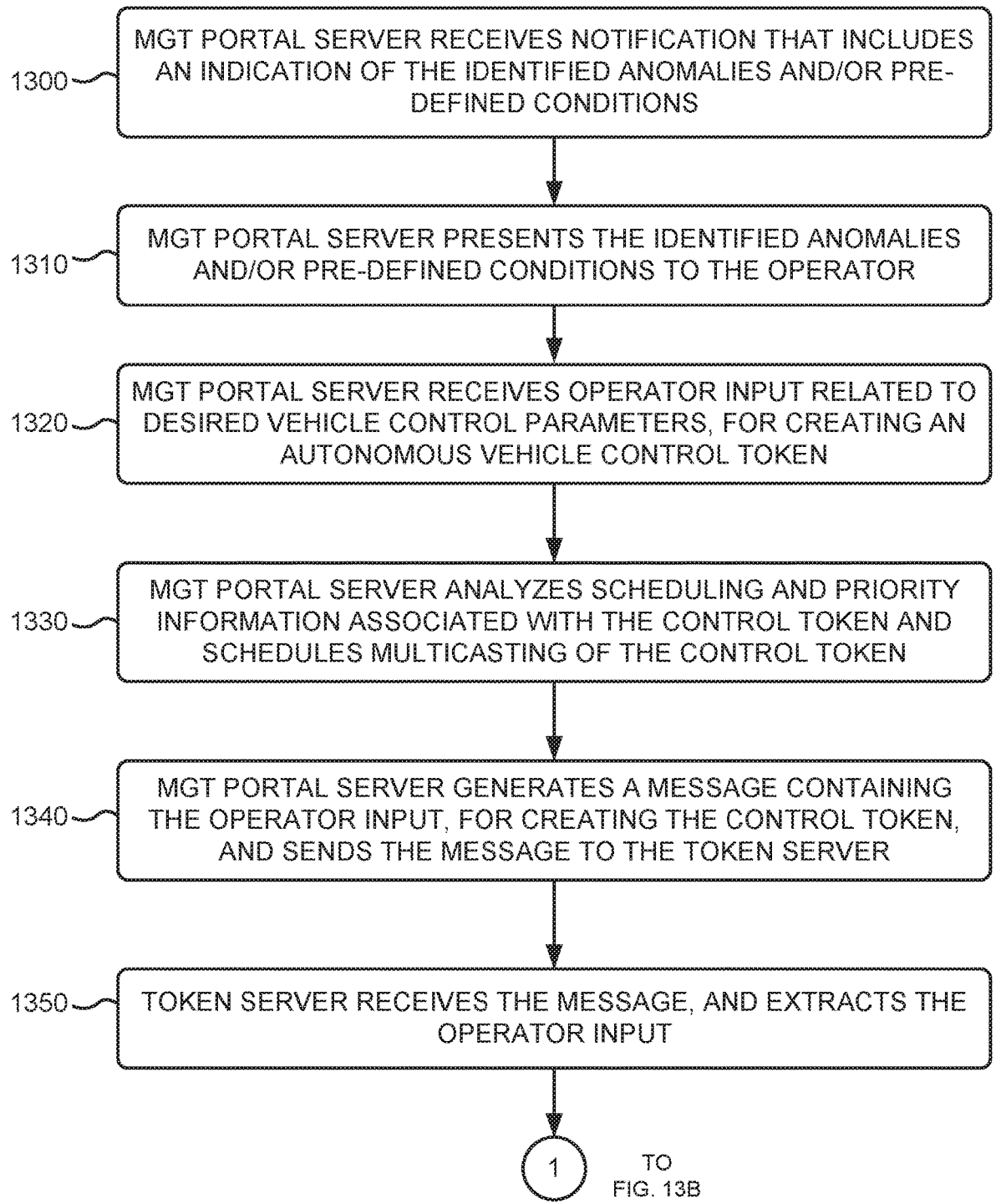
FIGS. 13A and 13B are flowcharts that illustrate an exemplary process for creating an autonomous vehicle control token and for multicasting the created control token to autonomous vehicles.
Figure 13B:
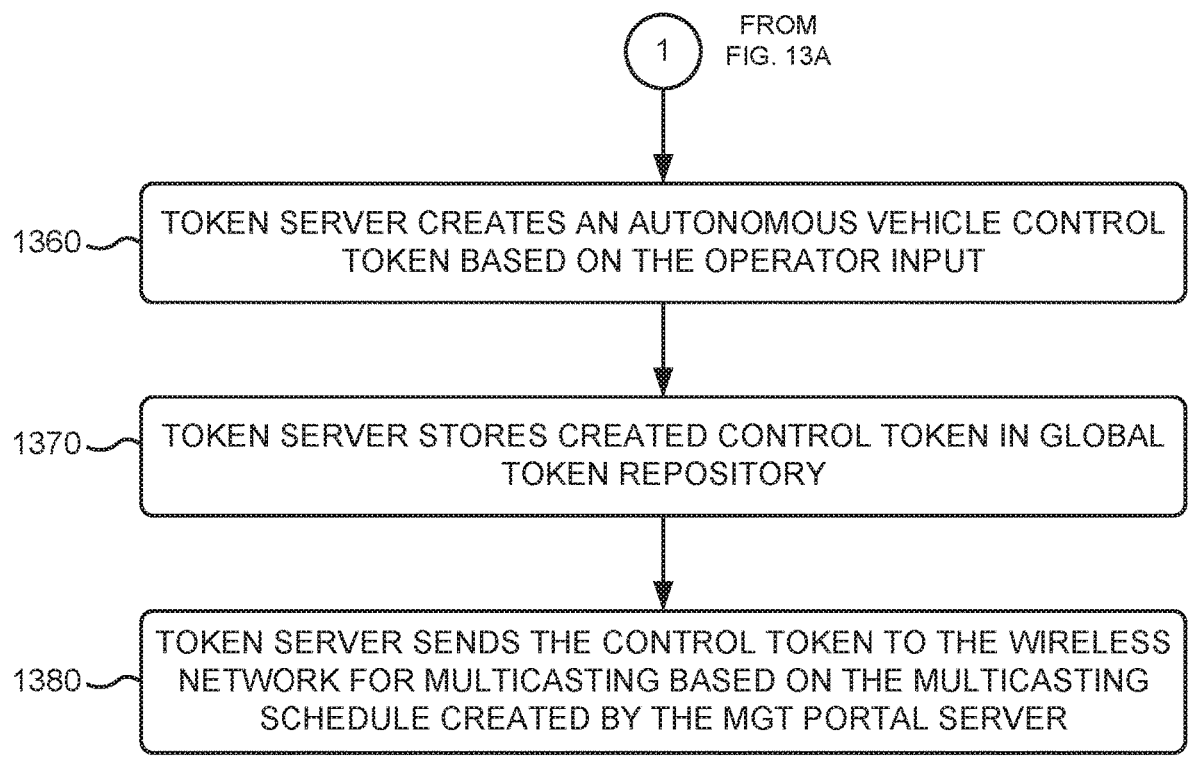

FIGS. 13A and 13B are flowcharts that illustrate an exemplary process for creating an autonomous vehicle control token 110 and for multicasting the created control token 110. The exemplary process of FIGS. 13A and 13B may be implemented by management portal server 235 in conjunction with token server 220. The exemplary process of FIGS. 13A and 13B is described below with reference to the exemplary user interfaces of FIGS. 14-17, and the exemplary messaging diagram of FIG. 18.

Figure 18:
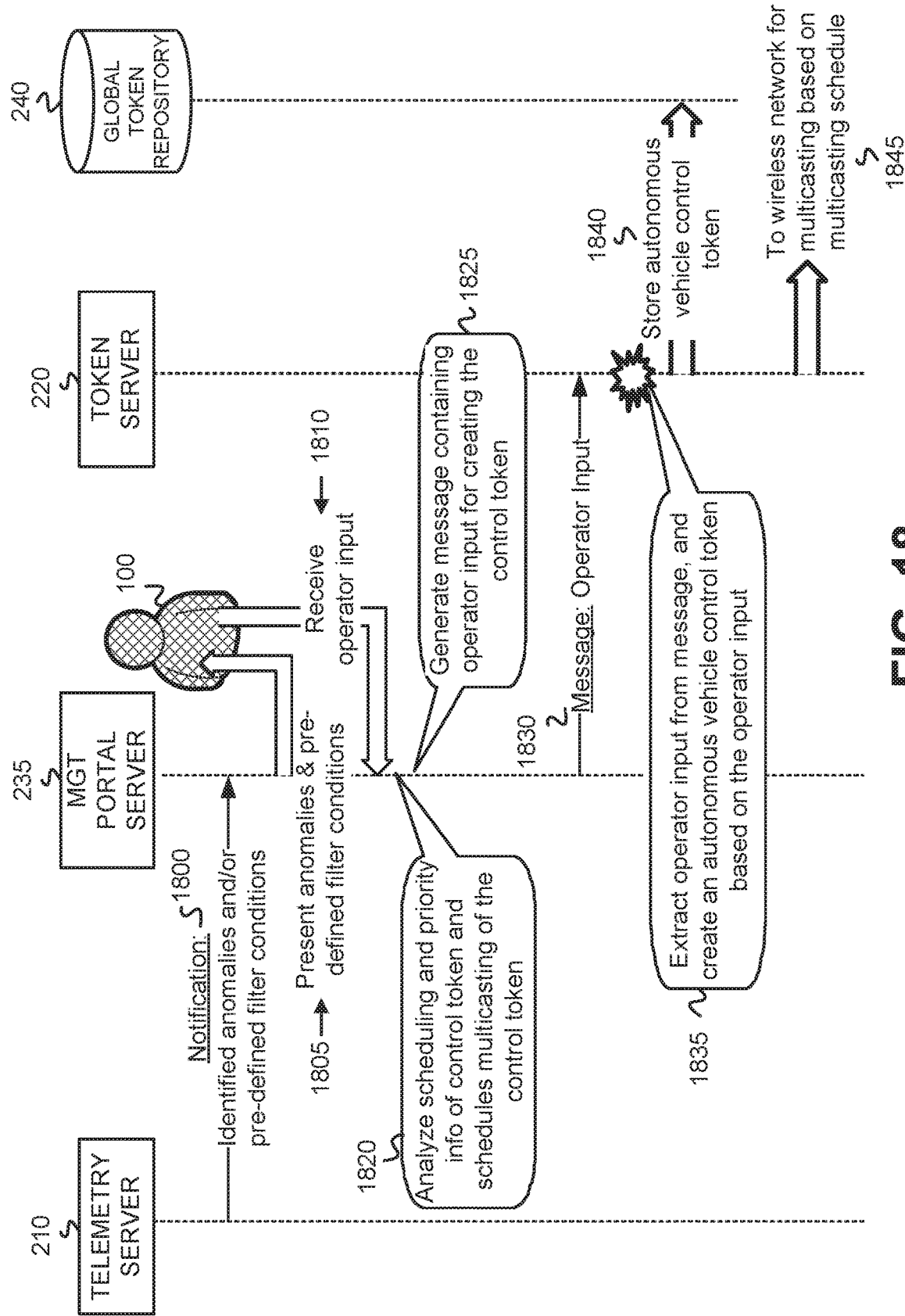
FIG. 18 is an exemplary messaging diagram associated with the exemplary process of FIG. 11.

The exemplary process includes management portal server 235 receiving a notification that includes an indication of the identified anomalies and/or pre-defined conditions (block 1300). The notification was previously generated by telemetry server 210 in block 1120 of FIG. 11, and includes a telemetry data-based identification of one or more anomalies and/or pre-defined conditions. The anomalies and/or pre-defined conditions may apply globally to all autonomous vehicles 125 in a particular service area, or may apply only to a subset of autonomous vehicles 125 that are relevant to the operator 100, where the operator 100 includes an authorized person of a government entity (e.g., city, county, state, federal), a business entity (e.g., owner of a fleet of shipping trucks), or an automotive OEM. As shown in FIG. 18, management portal server 235 receives a notification 1800 that includes identified anomalies and/or pre-defined conditions.

Management portal server 235 presents the identified anomalies and/or pre-defined conditions to operator 100 (block 1310). Management portal server 235 may list the identified anomalies and/or pre-defined conditions via a user interface of portal server 235 in a format that enables operator 100 to easily determine the need for the application of remote control to the autonomous vehicles 125. FIG. 18 depicts management portal server 235 presenting 1805 the anomalies and pre-defined conditions, received in the notification 1800, to operator 100.

Figure 14:
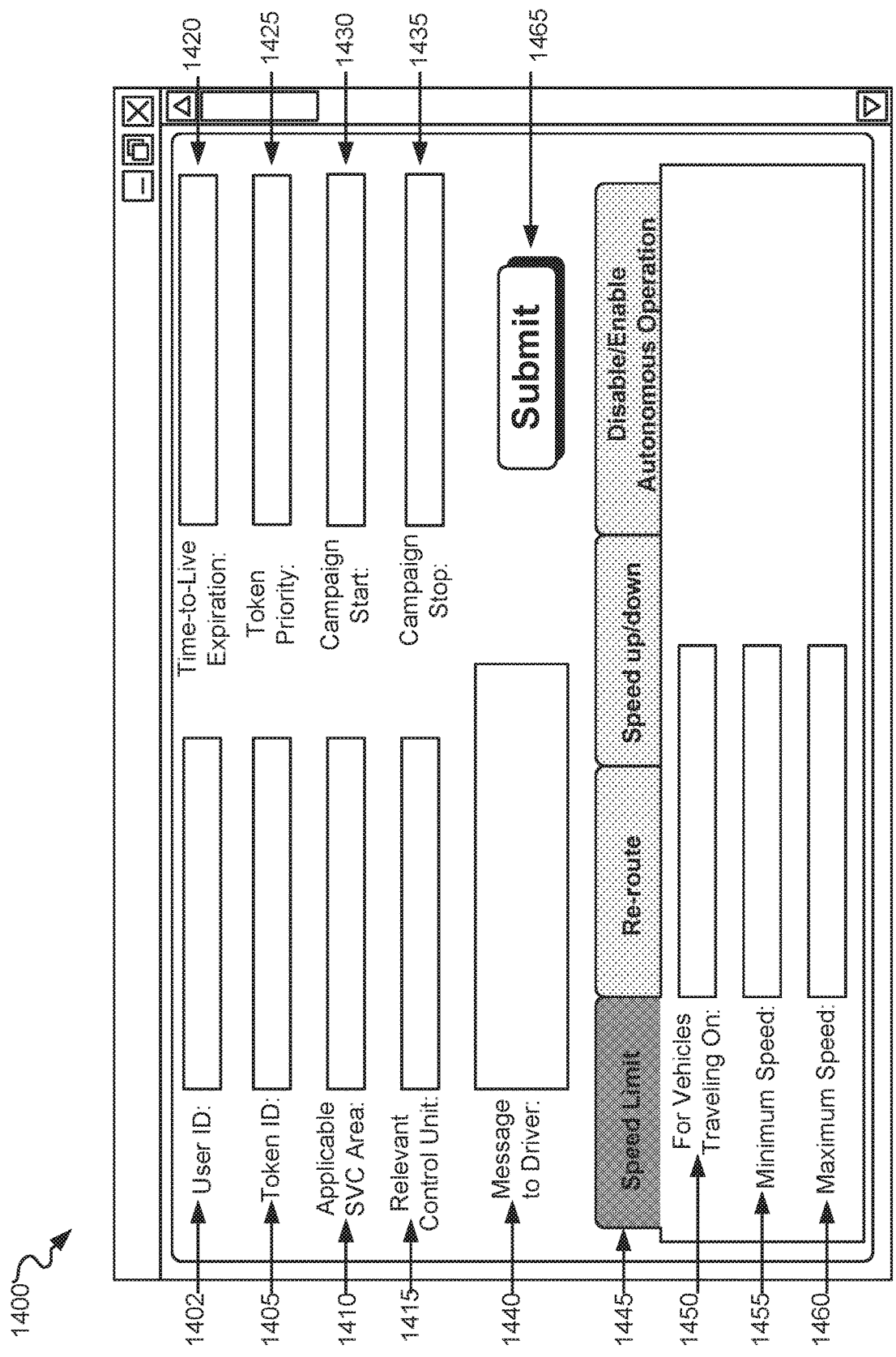
FIGS. 14-17 illustrate examples of user interfaces that permit the selection of multiple different control token types, with each control token type having different entry blocks for entering different types of control/command fields.

Management portal server 235 receives operator input, from operator 100, related to desired vehicle control parameters, for creating an autonomous vehicle control token (block 1320). Management portal server 235 may present, as shown in FIG. 14, a graphical user interface 1400 that enables operator 100 to provide the various types of information and vehicle control parameters to be included within the control token. User interface 1400 may include a user ID entry block 1402, a token ID entry block 1405, an applicable service area entry block 1410, a relevant control unit entry block 1415, a time-to-live expiration entry block 1420, a token priority entry block 1425, a campaign start entry block 1430, a campaign stop entry block 1435, and a message to drive entry block 1440.

User ID entry block 1402 includes an area of user interface 1400 into which operator 100 may enter a GUID for operator 100. Operator 100 may use the input device 365 of management portal server 235, wherein the input device 365 may include a physical QWERTY keyboard, or a QWERTY graphical keyboard displayed via a touch screen display.

Token ID entry block 1405 includes an area of user interface 1400 into which operator 100 may enter a unique token ID for the control token being created. Alternatively, management portal server 235 may automatically generate and assign a unique token ID to the control token being generated. As a further alternative, operator 100 may enter a unique password, or other unique alphanumeric code, and management portal server 235 may apply an algorithm to the password or code, such as, for example, a hash algorithm, to generate a unique token ID for the control token being created.

Applicable service area entry block 1410 includes an area of user interface 1400 into which operator 100 may enter the identifiers of each of the service areas to which the current control token is applicable. For example, if the control token is applicable to service areas 5 and 8, within multiple service areas, then operator 100 enters the identifiers for service areas 5 and 8 into entry block 1410.

Relevant control unit entry block 1415 includes an area of user interface 1400 into which operator 100 may enter an identifier for the unit(s) and/or device(s) of vehicle 125 that are to be controlled by control commands contained in the control token. Time-to-live expiration entry block 1420 includes an area of user interface 1400 into which operator 100 may enter an expiration time for the control token, after which the control token is no longer effective and may be deleted from repository 240.

Token priority entry block 1425 includes an area of user interface 1400 into which operator 100 may enter a priority value for the control token, where multiple different levels of priority values may be assigned to the control token. For example, in one implementation, two different priority levels may be assigned to the control token: standard priority or high priority. High priority control tokens may be given priority in the scheduling of multicast transmissions over control tokens assigned a standard priority. In other implementations, three or greater levels of priority may be used for assigning a priority to each autonomous vehicle control token 110.

Campaign start entry block 1430 includes an area of user interface 1400 into which operator 100 may enter a start time to be applied to the control commands contained in the control token (i.e., a time at which the control command(s) contained in the control token are executed at vehicle 125). Campaign stop entry block 1435 includes an area of user interface 1400 into which operator 100 may enter an end time to be applied to the control commands contained in the control token (i.e., a time at which execution of the control command(s) contained in the control token are discontinued at vehicle 125). Message to drive entry block 1440 includes an area of user interface 1400 into which operator 100 may enter a message that is to be presented to the driver of vehicle 125 during execution of the control command(s) contained in the control token.

As further shown in FIG. 14, multiple different control token types may be selected from user interface 1400, with each control token type having different entry blocks for entering different types of control/command fields. In the example of FIG. 14, four different control token types are shown as being available for selection by operator 100: speed limit, re-route, speed up/down, disable/enable autonomous operator, with speed limit 1445 being the control token type being highlighted and selected by operator 100. In other implementations, however, control token types, different from and in addition to those depicted in the example of FIG. 14, may be available via user interface 1400 for selection by operator 100. As shown in FIG. 14, with the selection of speed limit 1445 control type token, user interface 1400 additionally presents a "for vehicles traveling on:" entry block 1450, a minimum speed entry block 1455, and a maximum speed entry block 1460.

"For vehicles traveling on:" entry block 1450 includes an area of user interface 1400 into which operator 100 may enter a roadway (e.g., freeway, highway, state road) to which the speed limit is going to be applied. The operator 100 may enter additional information in block 1450 beyond just an identification of the roadway, including a range of exits (e.g., interstate I-10 between exits 50 and 100, state route 50 between city A and city B) over which the speed limit is to be applied. Minimum speed entry block 1455 includes an area of user interface 1400 into which operator 100 may enter the minimum speed at which the vehicle should drive while traveling on the roadway identified in block 1450. Maximum speed entry block 1460 includes an area of user interface 1400 into which operator 100 may enter the maximum speed at which the vehicle should drive while traveling on the roadway identified in block 1450. Once operator 100 has provided values in each of the entry blocks presented in user interface 1400, operator 100 may select "submit" button 1465 for the control token to be generated using the entered information.

Figure 15:
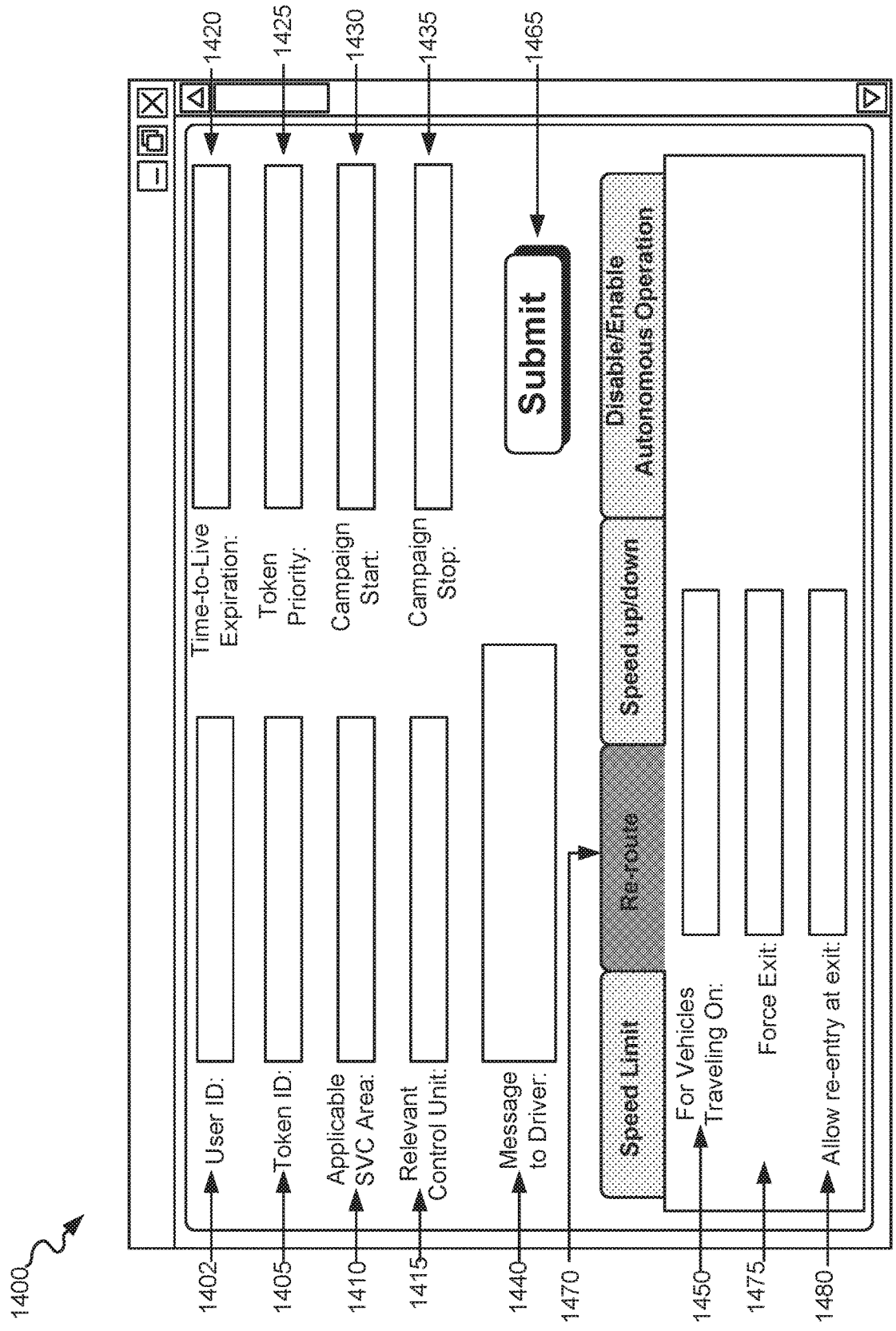

FIG. 15 illustrates user interface 1400 in an example in which operator 100 has highlighted and selected the "re-route" control token type 1470. As shown, this control token type additionally includes the "For vehicles traveling on:" entry block 1450, as previously described, a "force exit" entry block 1475, and an "allow re-entry at exit" entry block 1480. "Force exit" entry block 1475 includes an area of user interface 1400 into which operator 100 may enter an exit or intersection, along the roadway identified in block 1450, at which the vehicle 125 must exit the roadway. "Allow re-entry at exit" entry block 1480 includes an area of user interface 1400 into which operator 100 may enter the exit or intersection, along the roadway identified in block 1450, at which the vehicle 125 may re-enter the roadway.

Figure 16:
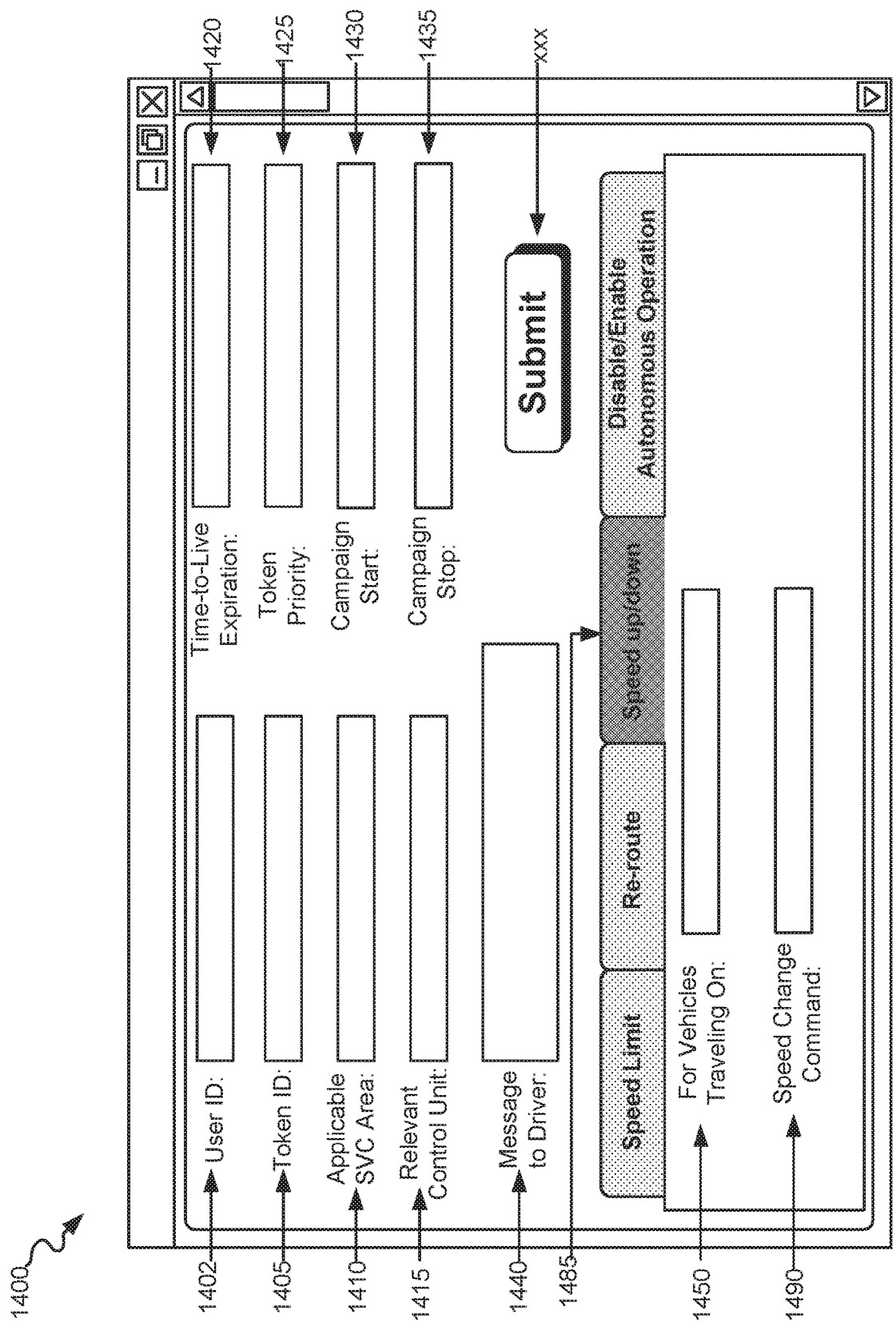

FIG. 16 illustrates user interface 1400 in an example in which operator 100 has highlighted and selected the "speed up/down" control token type 1485. As shown, this control token type additionally includes the "For vehicles traveling on:" entry block 1450, as previously described, and a "speed change command" entry block 1490. "Speed change command" entry block 1490 enables operator 100 to enter a particular command for controlling the speed of the vehicle 125. For example, the speed change command may include a command to increase the vehicle's speed by 10 mph along the roadway identified in entry block 1450. As another example, the speed change command may include a command to decrease the vehicle's speed by 15 mph along the roadway identified in entry block 1450.

Figure 17:
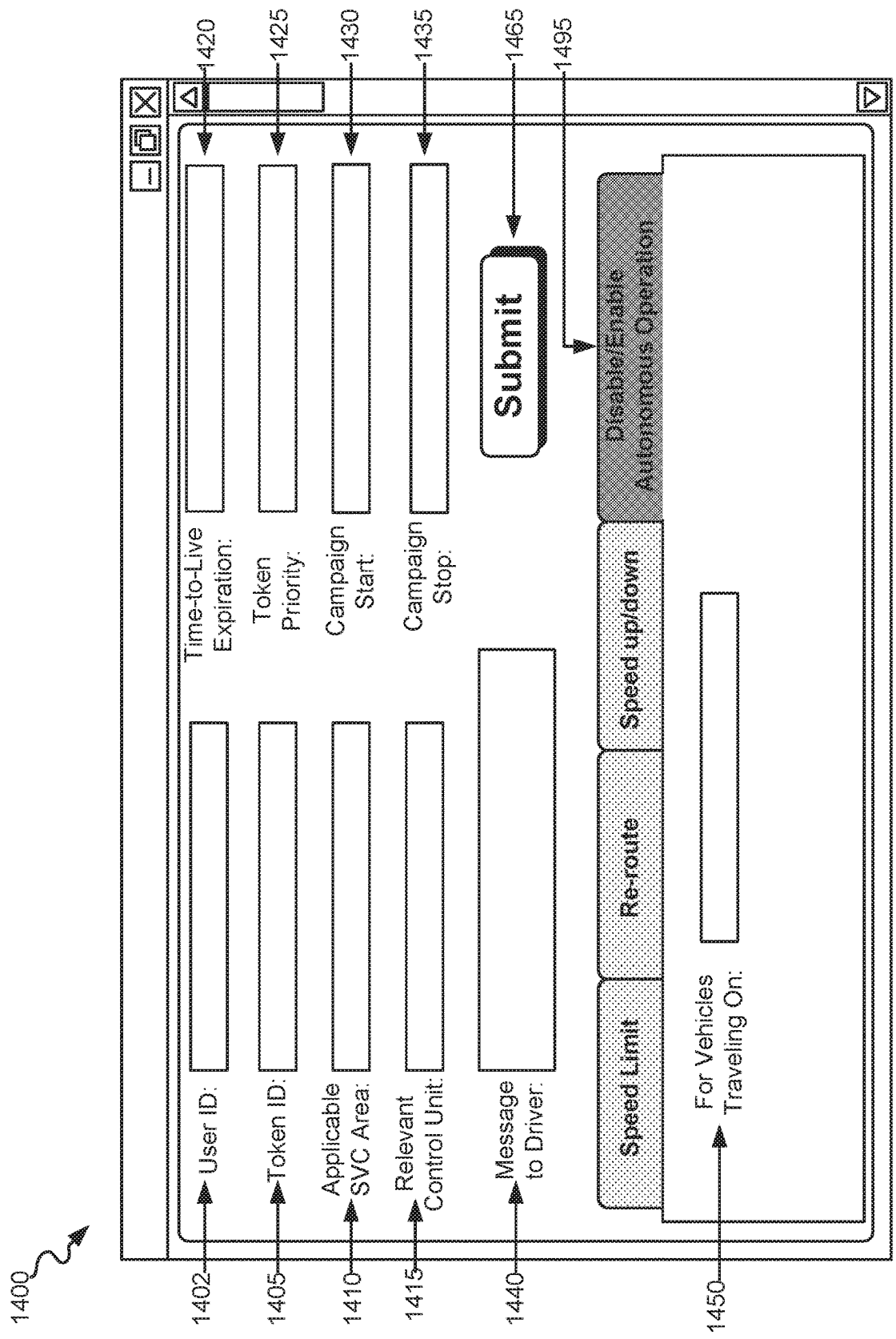

FIG. 17 illustrates user interface 1400 in an example in which operator 100 has highlighted and selected the "disable/enable autonomous operation" control token type 1495. As shown, this control token type includes the "For vehicles traveling on:" entry block 1450, as previously described, that enables operator 100 to identify the roadway over which autonomous vehicle operation is either enabled, or disabled, based on the control token. If the control token disables autonomous vehicle operation, then the driver of the vehicle 125 must manually drive the vehicle until the disable command is rescinded, or expires. If the control token enables autonomous vehicle operation, then the driver of the vehicle 125 may be prohibited from taking manual control of the vehicle 125 until the enable command is rescinded, or expires.

In addition to the various input parameters of the control token 110, described with respect to the user interface 1400 of FIGS. 14-17, user interface 1400 may additionally enable operator 110 to select or supply a time-to-live value, a token priority value, and/or other scheduling data in addition to campaign start and campaign stop times. As shown in FIG. 18, management portal server 235 receives operator input 1810 from operator 100.

Management portal server 235 analyzes scheduling and priority information associated with the control token and schedules multicasting of the control token (block 1330). Management portal server 235 may retrieve a priority value, a campaign start time, and a campaign end time, from the operator input information received from operator 100. Management portal server 235 may then compare this retrieved information with corresponding information retrieved with respect to other control tokens, from global token repository 240, to identify a schedule for multicasting the current control token 110 among the other control tokens. For example, if the control token 110 has a higher priority than the other control tokens needing multicasting, then the control token 110 may be multicast first, followed by the other control tokens. The scheduling and re-scheduling of the transmitting/multicasting of control tokens 110 may occur on a continuous basis as new operator input is received, and new control tokens are created. FIG. 18 depicts management portal server 235 analyzing 1820 the scheduling and priority information associated with the control token, and scheduling multicasting of the control token. Management portal server 235 may coordinate the scheduling of the multicasting of control tokens with one or more nodes or network devices in wireless network 115.

Management portal server 235 generates a message containing the operator input, for creating the control token, and sends the message to token server 220 (block 1340). Upon receipt of the message, token server 220 extracts the operator input (block 1350), and creates an autonomous vehicle control token based on the extracted operator input (block 1360). FIG. 18 depicts management portal server 235 generating 1825 a message containing the operator input, and sending the message 1830 that includes the operator input to token server 220. As further shown in FIG. 18, token server 220 extracts 1835 the operator input from the received message 1830, and creates an autonomous vehicle control token based on the operator input. Token server 220 stores the created control token in global token repository 240 (block 1370). Token server 220 may store the created control token in a field 630 of an appropriate entry 600 of repository 240. FIG. 18 depicts token server 220 storing 1840 the created control token in global token repository 240.

In an alternative implementation of the process of FIGS. 13A and 13B, blocks 1310 and 1320, which use operator 100 input to management portal server 235 and token server 220 for generating an autonomous vehicle control token 110, may be substituted by the automatic creation of one or more control tokens based on the identified anomaly(ies) and/or pre-defined filter condition(s). In this alternative implementation, telemetry server 210 may send notifications, that include the identified anomaly(ies) and/or pre-defined filter condition(s), to token server 220, and token server 220 may automatically apply one or more algorithms, or pre-defined rules, to the identified anomaly(ies) and/or pre-defined filter condition(s) to determine whether remote control of one or more autonomous vehicles 125 is needed, and what the content of the autonomous vehicle control token(s) 110 should be based on the determination.

Token server 220 sends the created control token to the wireless network 115 for multicasting based on the multicasting schedule created (e.g., in block 1330) by management portal server 235 (block 1380) FIG. 18 depicts token server 220 sending the created control token to wireless network 115 for multicasting based on the multicasting schedule created (e.g., in block 1330) by management portal server 235. Multicasting of the autonomous vehicle control token 110 may include token server 220 pushing the control token 110 to BM-SC 255 in wireless network 115, and BM-SC 255 then sending the control token 110 to MBMS-GW 260. Upon receipt, MBMS-GW 260 broadcasts the control token 110, over a multicast bearer, to each eNB 280 in eMBMS synchronization area(s) 275. Each eNB 280, in turn, broadcasts the control token 110 to autonomous vehicles 125 served by each eNB 280 via, for example, a particular channel within eMBMS synchronization area 275.

At each autonomous vehicle 125 that receives a multicast control token 110, multicast client 420 extracts the data from the fields of the control token 110, including the vehicle type identified in field 720, and the relevant control unit identified in field 770. If the autonomous vehicle 125 that receives the multicast control token 110 conforms to the vehicle type identified in field 720 (e.g., vehicle 125 is a consumer vehicle if field 720 identifies a consumer vehicle), then multicast client 420 sends the data retrieved from the control token 110 to the identified relevant control unit. For example, if the navigation unit is identified in field 770, then multicast client 420 sends the data extracted from control token 110 to navigation unit 440 of autonomous vehicle 125. Navigation unit 440 uses the data extracted from the control token, such as, for example, data extracted from control/command fields 750, to alter the navigation of the vehicle 125. In a circumstance where the autonomous vehicle control token 110 comprises the example shown in FIG. 8B, which is directed to re-routing one or more vehicles 125, then navigation unit 440 uses the data from fields 700, 820, 830, and 840 to change the route being driven by the vehicle 125.

If, instead, the autonomous driving control unit is identified in field 770, then multicast client 420 sends the data extracted from control token 110 to autonomous driving control unit 430 of autonomous vehicle 125. Autonomous driving control unit 430 uses the data extracted from the control token 110, such as, for example, data extracted from control/command fields 750, to change the operation of, or the driving control of, vehicle 125. In a circumstance where the autonomous vehicle control token 110 comprises the example shown in FIG. 8C, which is directed to enabling or disabling autonomous operation of the vehicle, then autonomous driving control unit 430 uses the data from fields 700 and 820 to disable autonomous operation of the vehicle 125 when the vehicle has driven onto the Garden State Parkway.

The exemplary process of FIGS. 13A and 13B may be repeated each time a management portal server 235 receives a notification of identified anomalies and/or pre-defined conditions (e.g., a notification sent in block 1120 of FIG. 11). Alternatively, only blocks 1320, 1340, and 1350-1370, of FIGS. 13A and 13B may be repeated each time an operator 100 creates an autonomous vehicle control token 110 via management portal server 235, and token server 220 creates and stores the created control token 110 in repository 240. Furthermore, blocks 1330 and 1380 may be performed independently of the remaining blocks of FIGS. 13A and 13B, such that management portal server 235 continuously, or periodically, analyzes the scheduling and priority information associated with multiple control tokens stored in repository 240 to generate a multicasting schedule for multicasting the multiple control tokens.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 9, 11, 13A, and 13B, and message/operation flows with respect to FIGS. 10, 12, and 18, the order of the blocks and/or message flows may be varied in other implementations. Moreover, non-dependent blocks may be performed in parallel. For example, while embodiments have been described in the context of Evolved MBMS (eMBMS), or LTE broadcast, in other embodiments, multicasting may be implemented in other types of wireless networks (i.e., other than LTE networks) using MBMS.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
 receiving, at a device, input from an entity that is authorized to select parameters associated with issuing remote control commands to multiple autonomous vehicles operated in a geographic service area;
 generating, by the device, an autonomous vehicle control token based on selected parameters; and
 transmitting, from the device, the autonomous vehicle control token via a plurality of multicast bearers associated with multiple synchronized base stations of the geographic service area in a wireless network, to the multiple autonomous vehicles over a same multicast channel.

2. The method of claim 1, wherein the geographic service area includes public roadways, and wherein the entity comprises a governmental authority for the public roadways.

3. The method of claim 1, wherein the wireless network comprises a fifth generation (5G) network.

4. The method of claim 3, wherein the geographic service area comprises a multimedia broadcast multicast services (MBMS) service area.

5. The method of claim 1, wherein the wireless network comprises a fourth generation (4G) network, and wherein the multiple base stations comprise eNodeBs.

6. The method of claim 5, wherein the geographic service area comprises an evolved multimedia broadcast multicast services (eMBMS) service area.

7. The method of claim 1, wherein the selected parameters comprise a token type that indicates a type of autonomous vehicle control to execute by at least one remote control command, and wherein the type of autonomous vehicle control comprises one of a consumer class control, a commercial class control, or a fleet class control.

8. The method of claim 1, wherein the entity comprises an original equipment manufacturer (OEM) associated with equipment that is specified by the OEM as subject to an alert condition.

9. The method of claim 1, further comprising:
 receiving telemetry data from the multiple autonomous vehicles, wherein the received input is responsive to the received telemetry data.

10. A network device, comprising:
 a processor configured to:
  receive input from an entity that is authorized to select parameters associated with issuing remote control commands to multiple autonomous vehicles operated in a geographic service area;
  generate an autonomous vehicle control token based on selected parameters; and transmit the autonomous vehicle control token via a plurality of multicast bearers associated with multiple synchronized base stations of the geographic service area in a wireless network, to the multiple autonomous vehicles over a same multicast channel.

11. The network device of claim 10, wherein the geographic service area includes public roadways, and wherein the entity comprises a governmental authority for the public roadways.

12. The network device of claim 10, wherein the wireless network comprises a fifth generation (5G) network.

13. The network device of claim 12, wherein the geographic service area comprises a multimedia broadcast multicast services (MBMS) service area.

14. The network device of claim 10, wherein the selected parameters comprise a token type that indicates a type of autonomous vehicle control to execute by at least one remote control command, and wherein the type of autonomous vehicle control comprises one of a consumer class control, a commercial class control, or a fleet class control.

15. The network device of claim 10, wherein the entity comprises an original equipment manufacturer (OEM) associated with equipment that is specified by the OEM as subject to an alert condition.

16. The network device of claim 10, wherein the processor is further configured to:
receive telemetry data from the multiple autonomous vehicles, wherein the received input is responsive to the received telemetry data.

17. A non-transitory storage medium storing instructions executable by a network device, wherein the instructions comprise instructions to cause the network device to:
receive input from an entity that is authorized to select parameters associated with issuing remote control commands to multiple autonomous vehicles operated in a geographic service area;
generate an autonomous vehicle control token based on selected parameters; and
transmit the autonomous vehicle control token via a plurality of multicast bearers associated with multiple synchronized base stations of the geographic service area in a wireless network, to the multiple autonomous vehicles over a same multicast channel.

18. The non-transitory storage medium of claim 17, wherein the geographic service area corresponds to public roadways, and wherein the entity comprises a governmental authority for the public roadways.

19. The non-transitory storage medium of claim 17, wherein the wireless network comprises a fifth generation (5G) network, and wherein the geographic service area comprises a multimedia broadcast multicast services (MBMS) service area.

20. The non-transitory storage medium of claim 17, wherein the wireless network comprises a fourth generation (4G) network, wherein the multiple base stations comprise multiple eNodeBs, and wherein the geographic service area comprises an evolved multimedia broadcast multicast services (eMBMS) service area.

\* \* \* \* \*